(12) United States Patent
Lockamy et al.

(10) Patent No.: US 7,264,437 B2
(45) Date of Patent: Sep. 4, 2007

(54) METHOD FOR LOADING AND UNLOADING A STORAGE CONTAINER WITH RESPECT TO A TRANSPORT VEHICLE

(75) Inventors: Timothy Aaron Lockamy, Louisburg, NC (US); Edward Morton Byrd, Burlington, NC (US); Thor Robert (Ted) Thisse, Critz, VA (US)

(73) Assignee: Pack-Rat Mini-Mover, LLC, Wake Forest, NC (US)

( * ) Notice: Subject to any disclaimer, the term of this patent is extended or adjusted under 35 U.S.C. 154(b) by 0 days.

(21) Appl. No.: 11/298,580

(22) Filed: Dec. 12, 2005

(65) Prior Publication Data

US 2006/0104802 A1 May 18, 2006

Related U.S. Application Data

(62) Division of application No. 10/395,861, filed on Mar. 24, 2003, now Pat. No. 7,074,004.

(51) Int. Cl.
*B60P 1/00* (2006.01)
(52) U.S. Cl. ..................................... 414/812
(58) Field of Classification Search ............ 414/458, 414/475, 546, 549, 812
See application file for complete search history.

(56) References Cited

U.S. PATENT DOCUMENTS 3,971,486 A   7/1976  Carlsson
4,278,390 A   7/1981  Ahearn
5,374,156 A  12/1994  Simpson et al.
5,391,043 A   2/1995  Bohata et al.
5,395,201 A   3/1995  Yamashita et al.
5,669,750 A   9/1997  Vieselmeyer
6,071,062 A   6/2000  Warhurst et al.
6,155,770 A  12/2000  Warhurst

*Primary Examiner*—Charles A Fox
(74) *Attorney, Agent, or Firm*—Nixon & Vanderhye P.C.

(57) ABSTRACT

A device adapted to operably engage a vehicle to load and unload a container between the vehicle and a surface, and to cooperate with the vehicle to transport the container, is provided. Such a device includes a pair of laterally separated horizontal lifting members configured to be vertically movable with respect to the vehicle and a vertically-movable member operably engaged with the forward ends of the lifting members. A tether is operably engaged between each lifting member and the container so as to secure the container thereto. A translatory device is engaged between the vehicle and the vertically-movable member and configured to support the lifting members as well as move the lifting members longitudinally with respect to the vehicle. To unload the container, the vertically-movable member and the lifting members raise the container above the vehicle and then the translatory device longitudinally moves the container along the vehicle past a vertical plane defined by the rearward end thereof. The container is then lowered to the surface by the vertically-movable member and the lifting members and the tethers disengaged from the container. The reverse procedure loads the container onto the vehicle. Associated devices, systems, and methods are also provided.

15 Claims, 20 Drawing Sheets

Figure 1:
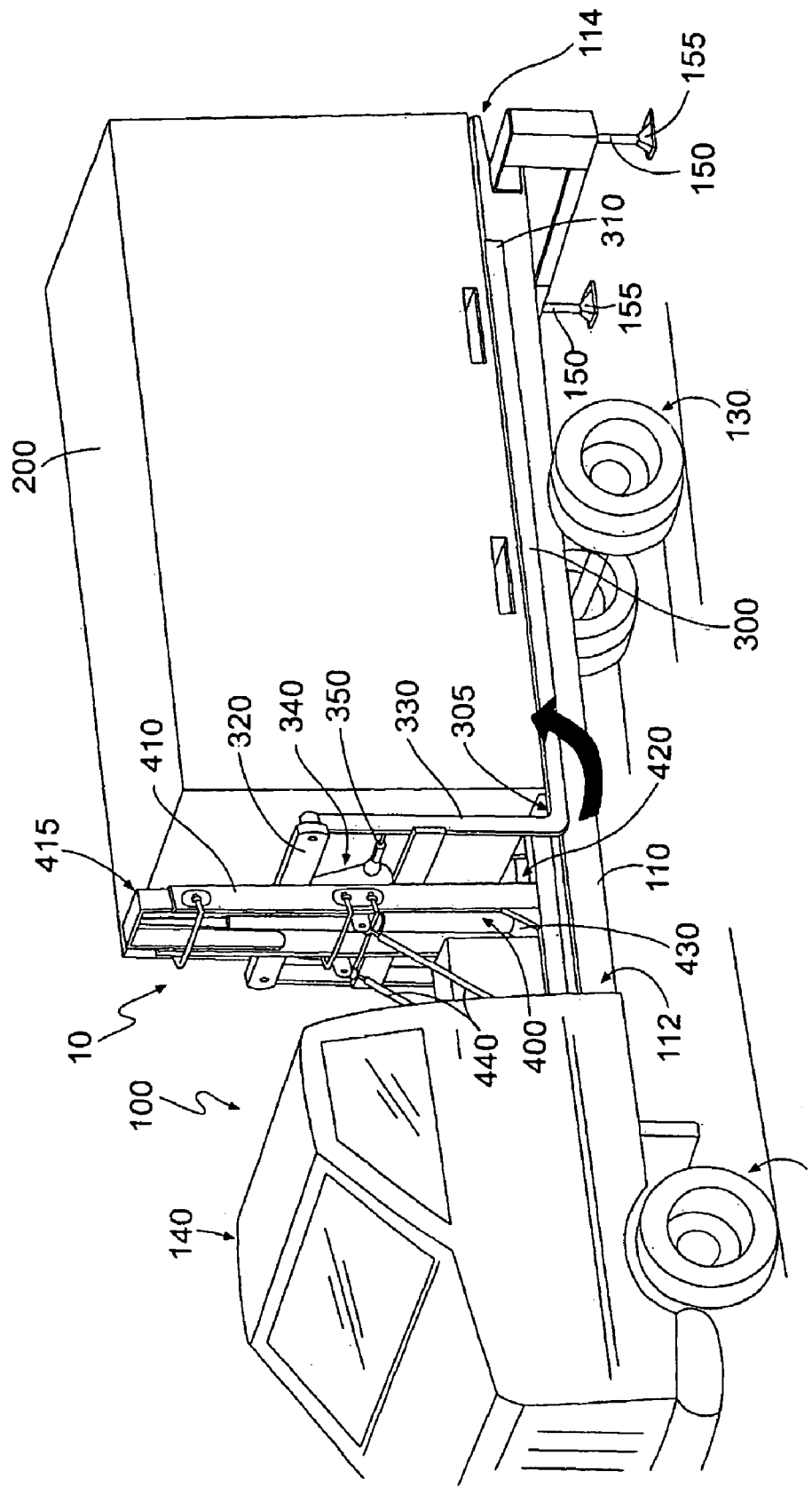

METHOD FOR LOADING AND UNLOADING A STORAGE CONTAINER WITH RESPECT TO A TRANSPORT VEHICLE

CROSS-REFERENCE TO PARENT APPLICATION AND PRIORITY CLAIM UNDER 35 USC §120

This application is a divisional of commonly owned U.S. application Ser. No. 10/395,861 filed on Mar. 24, 2003, now U.S. Pat. No. 7,074,004.

BACKGROUND OF THE INVENTION

1. Field of the Invention

The present invention relates to storage containers and, more particularly, to a device for loading and unloading a storage container with respect to a transport vehicle capable of transporting the storage container, and an associated system and method 2. Description of Related Art Containers, particularly road-transportable shipping containers, are important commodities that are commonly used to ship and store cargo. In some instances, such shipping containers may be fixed in the form of a trailer having wheels disposed under the container and configured to be towed behind a tow vehicle, such as a tractor trailer. However, such trailers must often to backed up to a shipping dock, configured to compensate for the raised height of the container caused by the wheels, in order to permit convenient loading and unloading of the cargo. In instances where the cargo must be loaded and unloaded with respect to the ground, such a configuration may be inconvenient and/or result in additional labor, difficulty in handling of the cargo, and/or the need for additional equipment such as, for example, a forklift, to handle the cargo. Such trailer-type containers may also be difficult or inconvenient to store and/or ship due to the additional structure and handling requirements of the trailer components attached to the container.

One proposal has been to configure the container to be separable from the trailer. However, in order to load and unload the container with respect to the trailer, a crane with lifting cables attached to corner brackets typically found on shipping containers is often required. Accordingly, it may also be inconvenient and/or cost inefficient to provide a crane at each site where a container must be loaded and/or unloaded with respect to the trailer.

Another proposal has been, where the container is separable from the trailer, to provide a container handling device capable of being engaged with the container for loading and unloading the container, as well as transporting the container, independently of the trailer or transport vehicle. For example, U.S. Pat. No. 6,071,062 to Warhurst et al. and U.S. Pat. No. 6,155,770 to Warhurst disclose an apparatus configured to lift and lower a container, wherein the apparatus includes wheels at each corner such that the container can be rolled on the wheels and moved independently of the transport vehicle. However, such an apparatus, in some instances, may not be capable of negotiating certain terrain, may be cumbersome to transport and operate, or may even present a safety hazard when the container is supported thereby and raised above the ground.

Thus, there exists a need for an apparatus capable of loading and unloading a container with respect to a transport vehicle, wherein the apparatus is capable of deploying and retrieving the container with respect to a desired location on the ground or other surface. Such an apparatus should also be stable, should have a relatively simple and cost effective construction and operation, and should be readily transportable by the transport vehicle in addition to the container.

BRIEF SUMMARY OF THE INVENTION

The above and other needs are met by the present invention which, in one embodiment, provides a device adapted to be operably engaged with a transport vehicle having a forward end and a rearward end, so as to be capable of loading a container onto the vehicle from a surface, unloading the container from the vehicle to the surface, and cooperating with the vehicle to transport the container. Such a device comprises a pair of horizontal lifting members capable of being laterally separated by at least a width of the container, wherein each lifting member has a forward and a rearward end and is configured to be vertically movable with respect to the vehicle. A vertically-movable member is operably engaged with the forward ends of the lifting members such that the lifting members are capable of moving vertically in correspondence with the vertically-movable member, and such that the rearward ends of the lifting members are unsupported. A tether is capable of being operably engaged between the container and each lifting member so as to secure the lifting members to the container. A translatory device is engaged with the vehicle so as to be longitudinally movable with respect thereto, wherein the translatory device is operably engaged with the vertically-movable member and configured to support the lifting members. The translatory device is further configured to unload the container, after the container is raised above the vehicle by vertically-movable member and the lifting members, by longitudinally moving the container along the vehicle past a vertical plane defined by the rearward end thereof. The container is then lowered to the surface by the vertically-movable member and the lifting members. The translatory device is also configured to load the container onto the vehicle, after the container is raised from the surface by the vertically-movable member and the lifting members past a horizontal plane defined by the rearward end of the vehicle, by longitudinally moving the container along the vehicle toward the forward end thereof, whereafter the container is lowered onto the vehicle by the vertically-movable member and the lifting members.

Another advantageous aspect of the present invention comprises a system adapted to be capable of delivering a storage container to and from a surface, and to be capable of transporting the container. Such a system includes a transport vehicle having a forward and a rearward end, and a pair of horizontal lifting members capable of being laterally separated by at least a width of the container. Each lifting member has a forward and a rearward end and is configured to be vertically movable with respect to the vehicle. A vertically-movable member is operably engaged with the forward ends of the lifting members such that the lifting members are capable of moving vertically in correspondence with the vertically-movable member, and such that the rearward ends of the lifting members are unsupported. A tether is capable of being operably and removably engaged between the container and each lifting member so as to secure the lifting members to the container. A translatory device is engaged with the vehicle so as to be longitudinally movable with respect thereto, wherein the translatory device is operably engaged with the vertically-movable member and is configured to support the lifting members. The translatory device is further configured to unload the container, after the container is raised above the vehicle by vertically-movable member and the lifting members, by longitudinally moving the container along the vehicle past a vertical plane defined by the rearward end thereof. The container is lowered to the surface by the vertically-movable member and the lifting members. The translatory device is also configured to load the container onto the vehicle, after the container is raised from the surface by the vertically-movable member and the lifting members past a horizontal plane defined by the rearward end of the vehicle, by longitudinally moving the container along the vehicle toward the forward end thereof, whereafter the container is lowered onto the vehicle by the vertically-movable member and the lifting members.

Yet another advantageous aspect of the present invention comprises a method of unloading a storage container from a transport vehicle to a surface, wherein the vehicle has a forward and a rearward end. First, the container is raised over the vehicle with a pair of horizontal lifting members each having a forward end and a rearward end. The forward ends of the lifting members are operably engaged by a vertically-movable member such that the lifting members are vertically movable in correspondence therewith and such that the rearward ends of the lifting members are unsupported. The lifting members are laterally separated by at least a width of the container and are operably engaged with the container via a tether. The lifting members are then moved longitudinally rearward along the vehicle with a translatory device operably engaged between the vertically-movable member and the vehicle until the container extends past a horizontal plane defined by the rearward end of the vehicle. The lifting members are then lowered so as to lower the container to the surface before the tethers are disengaged from the container. The lifting members are then moved longitudinally forward along the vehicle toward the forward end so as to stow the lifting members about the vehicle.

Still another advantageous aspect of the present invention comprises a method of loading a storage container having sides onto a transport vehicle, the vehicle having a forward and a rearward end, from a surface with a pair of horizontal lifting members, wherein each lifting member has a forward and a rearward end, and wherein the lifting members are operably engaged at the front ends thereof by a vertically-movable member. The lifting members are thus configured to be vertically-movable with respect to the vehicle and in correspondence with the vertically-movable member. As such, the lifting members are first moved longitudinally rearward along the vehicle, with a translatory device operably engaged between the vehicle and the lifting members, and past a vertical plane defined by the rearward end thereof. The lifting members are then lowered until the lifting members are disposed on either side of and adjacent to the container, whereafter a tether is operably engaged between each lifting member and the container so as to secure the container thereto. The lifting members are then raised so as to raise the container from the surface and past a horizontal plane defined by the rearward end of the vehicle. The lifting members are moved longitudinally forward along the vehicle with the translatory device until the container is disposed over the vehicle, whereafter the lifting members are lowered so as to lower the container onto the vehicle such that the container is supported thereby.

Another advantageous aspect of the present invention comprises a device adapted to be operably engaged with a transport vehicle so as to be capable of loading a container onto the vehicle from a surface, unloading the container from the vehicle to the surface, and cooperating with the vehicle to transport the container, wherein the transport vehicle has a forward and a rearward end. Such a device includes a pair of horizontal lifting members laterally separated by at least a width of the container, with each lifting member having a forward and a rearward end, wherein each lifting member is configured to be vertically movable with respect to the vehicle. A tether is provided which is capable of being operably engaged between each lifting member and the container so as to secure the container thereto. A vertical post member having an upper end is operably engaged with each end of each lifting member such that each lifting member is capable of moving vertically therebetween. A pair of horizontal frame members is configured to operably engage the vehicle so as to be longitudinally slidable with respect thereto. The slidable frame members are laterally separated by at least the width of the container and correspond to the respective lifting members, wherein each slidable frame member has a forward and a rearward end and is configured to support the post members associated with each respective lifting member. The slidable frame members are further configured to unload the container, after the container is raised above the vehicle by the lifting members, by longitudinally sliding along the vehicle until the container is past a vertical plane defined by the rearward end of the vehicle, whereafter the container is lowered to the surface by the lifting members. The slidable frame members are also configured to load the container onto the vehicle, after the container is raised from the surface by the lifting members past a horizontal plane defined by the rearward end of the vehicle, by longitudinally sliding along the vehicle and retracting toward the forward end thereof.

Another advantageous aspect of the present invention comprises a system adapted to be capable of delivering a storage container to and from a surface, and to be capable of transporting the container. Such a system includes a transport vehicle having a forward and a rearward end. A pair of horizontal lifting members is laterally separated by at least a width of the container, wherein each lifting member has a forward and a rearward end and is configured to be vertically movable with respect to the vehicle. A tether is capable of being operably engaged between each lifting member and the container so as to secure the container thereto. A vertical post member having an upper end is operably engaged with each end of each lifting member such that each lifting member is capable of moving vertically therebetween. A pair of horizontal frame members is configured to operably engage the vehicle so as to be longitudinally slidable with respect thereto, wherein the slidable frame members are laterally separated by at least the width of the container and correspond to the respective lifting members. Each slidable frame member has a forward and a rearward end and is configured to support the post members associated with each respective lifting member. The slidable frame members are further configured to unload the container, after the container is raised above the vehicle by the lifting members, by longitudinally sliding along the vehicle until the container is past a vertical plane defined by the rearward end of the vehicle, whereafter the container is lowered to the surface by the lifting members. The slidable frame members are also configured to load the container onto the vehicle, after the container is raised from the surface by the lifting members past a horizontal plane defined by the rearward end of the vehicle, by longitudinally sliding along the vehicle and retracting toward the forward end thereof.

Still another advantageous aspect of the present invention comprises a method of unloading a storage container from a transport vehicle to a surface, wherein the vehicle has a forward and a rearward end. The container is first raised over the vehicle with a pair of horizontal lifting members laterally separated by at least a width of the container, wherein the lifting members are configured to be vertically movable with respect to the vehicle, and wherein each lifting member has a forward and a rearward end and is operably engaged with the container via a tether. A pair of horizontal slidable frame members is then slid longitudinally rearward along the vehicle until the container is past a vertical plane defined by the rearward end of the vehicle. The slidable frame members are laterally separated by at least the width of the container and support the respective lifting members. Thereafter, the lifting members are lowered so as to lower the container to the surface and the tethers are disengaged from the container. The slidable frame members are then slid longitudinally forward along the vehicle until the slidable frame members retract toward the forward end thereof.

A further advantageous aspect of the present invention comprises a method of loading a storage container having sides onto a transport vehicle from a surface, wherein the vehicle has a forward and a rearward end. A pair of horizontal slidable frame members is first slid longitudinally rearward along the vehicle until the slidable frame members extend off the rearward end thereof and are disposed on either side of and adjacent to the container. The slidable frame members are thereby laterally separated by at least the width of the container and respectively support a pair of horizontal lifting members. The lifting members are laterally separated by at least the width of the container and are configured to be vertically movable with respect to the vehicle, with each lifting member having a forward and a rearward end. A tether is operably engaged between each lifting member and the container so as to secure the container thereto. Thereafter, the lifting members are raised so as to raise the container from the surface and past a horizontal plane defined by the rearward end of the vehicle. The slidable frame members are then slid longitudinally forward along the vehicle until the slidable frame members retract toward the forward end thereof and the container is disposed over the vehicle, whereafter the container is lowered onto the vehicle such that the container is supported thereby.

Thus, embodiments of the present invention provide significant advantages as detailed further herein.

BRIEF DESCRIPTION OF THE SEVERAL VIEWS OF THE DRAWING(S)

Figure 13:
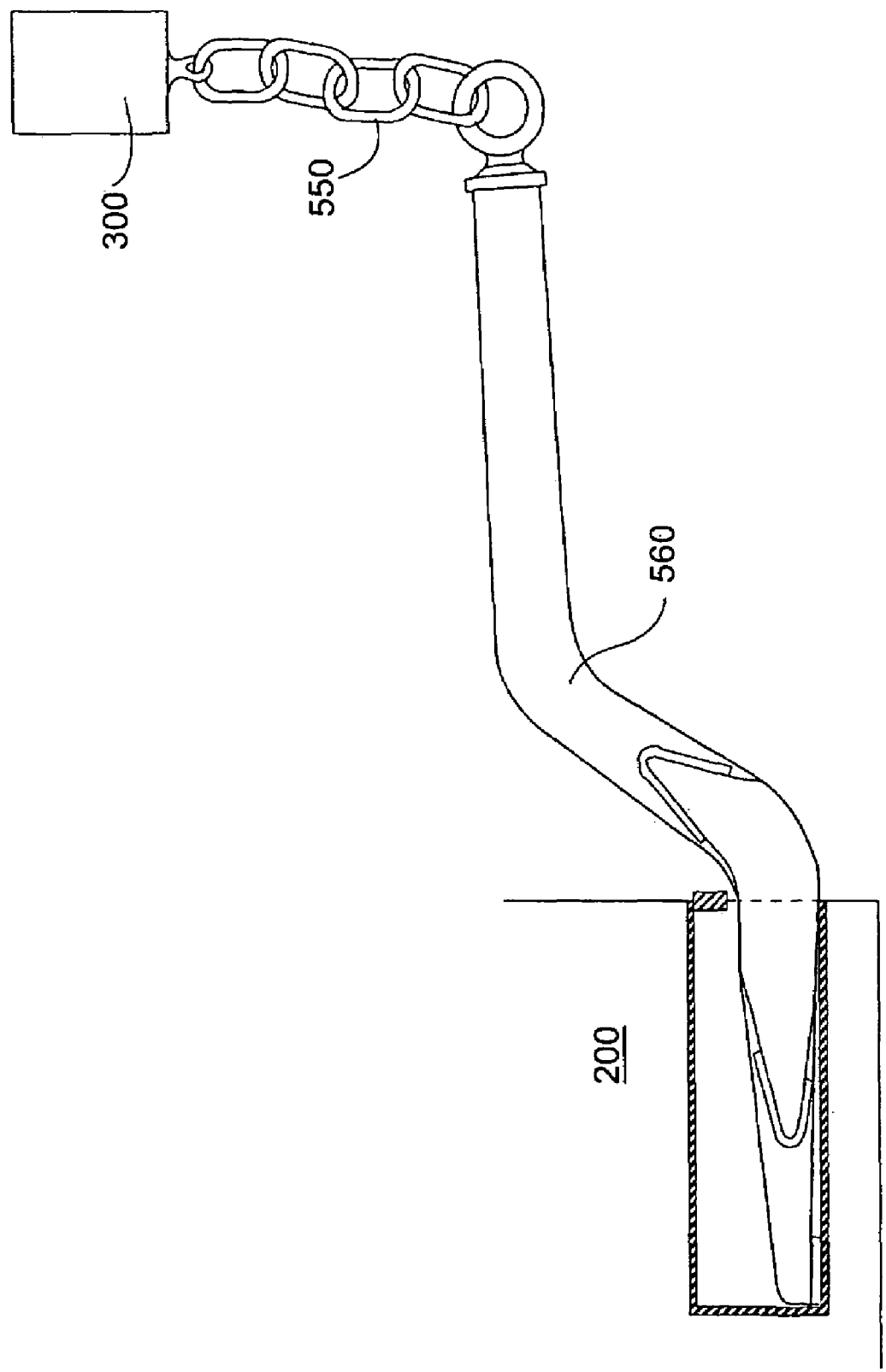

Having thus described the invention in general terms, reference will now be made to the accompanying drawings, which are not necessarily drawn to scale, and wherein:

FIGS. 1-12 schematically illustrate an operational sequence of a device adapted to load, unload, and transport a container with respect to a transport vehicle according to one embodiment of the present invention;

FIG. 13 schematically illustrates an alternate manner of securing the container to lifting members according to one embodiment of the present invention; and FIGS. 14-20 schematically illustrate an operational sequence of a device adapted to load, unload, and transport a container with respect to a transport vehicle according to an alternate embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

FIG. 1-12 illustrates an operational sequence of a device adapted to load, unload, and transport a portable storage container with respect to a transport vehicle, the device being indicated generally by the numeral 10 and the transport vehicle (otherwise referred to herein as "the vehicle") being indicated generally by the numeral 100. As shown, the vehicle 100 generally comprises a vehicle frame 110 extending between forward and rearward sets of wheels 120, 130, wherein a cab 140 is typically disposed on the vehicle frame 110 about the forward set of wheels 120. Such a vehicle 100 will be appreciated by one skilled in the art as being, for example, a truck configured to receive one of any number of bodies on the frame 110 behind the cab 140 though, in some instances, the vehicle 100 may comprise a variety of custom-built transporters within the spirit and scope of the present invention. The remainder of the vehicle frame 110 is configured to support the portable storage container 200 and has the device 10 operably engaged therewith. The remainder of the vehicle frame 110 thus generally defines a forward end 112 and a rearward end 114 of the portion of the vehicle 100 on which the portable storage container 200 is supported and transported (the forward 112 and rearward 114 ends of the portion of the vehicle 100 being otherwise referred to herein as the forward 112 and rearward 114 ends of the vehicle 100) and corresponds to a longitudinal direction along the vehicle 100. The vehicle frame 110 may further include two or more support members 150 attached thereto and, in some instances, toward the corners thereof. The support members 150 may be individually actuatable, with each having a foot 155 configured to extend to and engage the ground so as to provide support for and/or facilitate leveling of all or part of the vehicle frame 110 with respect to the ground 50. One skilled in the art will appreciate that such support members 150 may comprise and be operated by, for example, an appropriate hydraulic system, a chain/sprocket arrangement, electric or pneumatic devices, or any other device capable of extending the support members 150 to engage the ground and support and/or level all or part of the vehicle frame 110.

The device 10 includes a pair of generally horizontal lifting members 300 each having a forward end 305 and a rearward end 310 with respect to the orientation of the vehicle 100. The lifting members 300 are operably engaged at the forward ends 305 thereof to a vertically-movable member 320, leaving the rearward ends 310 unsupported. According to the illustrated embodiment, a connecting member 330 extends between the forward end 305 of the respective lifting member 300 and the vertically-movable member 320. More particularly, the connecting member 330 is pivotably engaged with the vertically movable member 320 and fixedly engaged with the forward end 305 of the lifting member 300. That is, the connecting member 330 may be attached to or integral with the forward end 305 of the lifting member 300. As such, pivoting of the connecting member 330 with respect to the vertically-movable member 320 affects the lateral separation of the lifting members 300. One skilled in the art will appreciate, however, that laterally spaced-apart lifting members 300 may be accomplished in many different manners. For example, in some instances, the connecting members 330 may be fixedly engaged with the vertically-movable member 320 and the vertically-movable member 320 configured to be lengthwise expandable, as will also be appreciated by one skilled in the art.

The assembly comprising the lifting members 300, the connecting members 330, and the vertically-movable member 320 may also include a spacing actuator 340 for controlling the pivoting of the connecting members 330 with respect to the vertically-movable member 320, and therefore the lateral spacing of the lifting members 300. The spacing actuator 340 may comprise, for example, a hydraulic system (not shown) having hydraulic rams 350 in appropriate communication and extending between the vertically-movable member 320 and the respective connecting member 330 or lifting member 300. The device 10 also includes a vertical movement device 400 operably engaged with the vertically-movable member 320 for raising and lowering the lifting members 300 with respect to the vehicle 100. As shown, such a vertical movement device 400 may comprise, for example, a mast 410 having an upper end 415 and a lower end 420, whereby the vertically-movable member 320, and thus the lifting members 300 that move in correspondence with the vertically-movable member 320, are configured to move between the upper and lower ends 415, 420. Such movement may be accomplished, for example, with an appropriate hydraulic system, a chain/sprocket arrangement, electric or pneumatic devices, or the like as will be readily appreciated by one skilled in the art. The lower end 420 of the mast 410 is engaged with a base 430, wherein the lower end 420 may be fixedly or pivotably engaged with the base 430. In instances where the mast 410 is pivotably engaged with the base 430, a pivot actuator 440 is engaged between the mast 410 and the base 430 and configured to move the upper end 415 of the mast 410 back and forth between the forward end 112 and the rearward end 114 of the vehicle 100 so as to control a tilt angle of the mast 410 with respect to the vehicle 100.

The device 10 further includes a translatory device 500 operably engaged between the vehicle frame 110 and the mast 410, wherein, in some instances, the base 430 and/or the pivot actuator 440 may comprise a component of the translatory device 500. The translatory device 500 is configured to move the base 430, and thus the vertically-movable member 320 and lifting members 300, longitudinally along the vehicle frame 110 between the forward and rearward ends 112, 114 thereof. One skilled in the art will readily appreciate that the translatory device 500 may comprise, for example, an appropriate hydraulic system, a chain/sprocket arrangement, electric or pneumatic devices, or other suitable device capable of translating the vertically-movable member 320 and the lifting members 300 longitudinally along the vehicle frame 110. Embodiments of the device 10, as described, may be in some instances, discrete with respect to the vehicle 100 though, in some instances, the device 10 may be formed as an integral part of the vehicle. It is within the scope of the present invention, though, that such a device 10 may be engaged with a stationary platform as an alternative to being implemented on a vehicle 100 and that many other uses of such a device 10 may be contemplated in addition to that disclosed herein.

Figure 2:
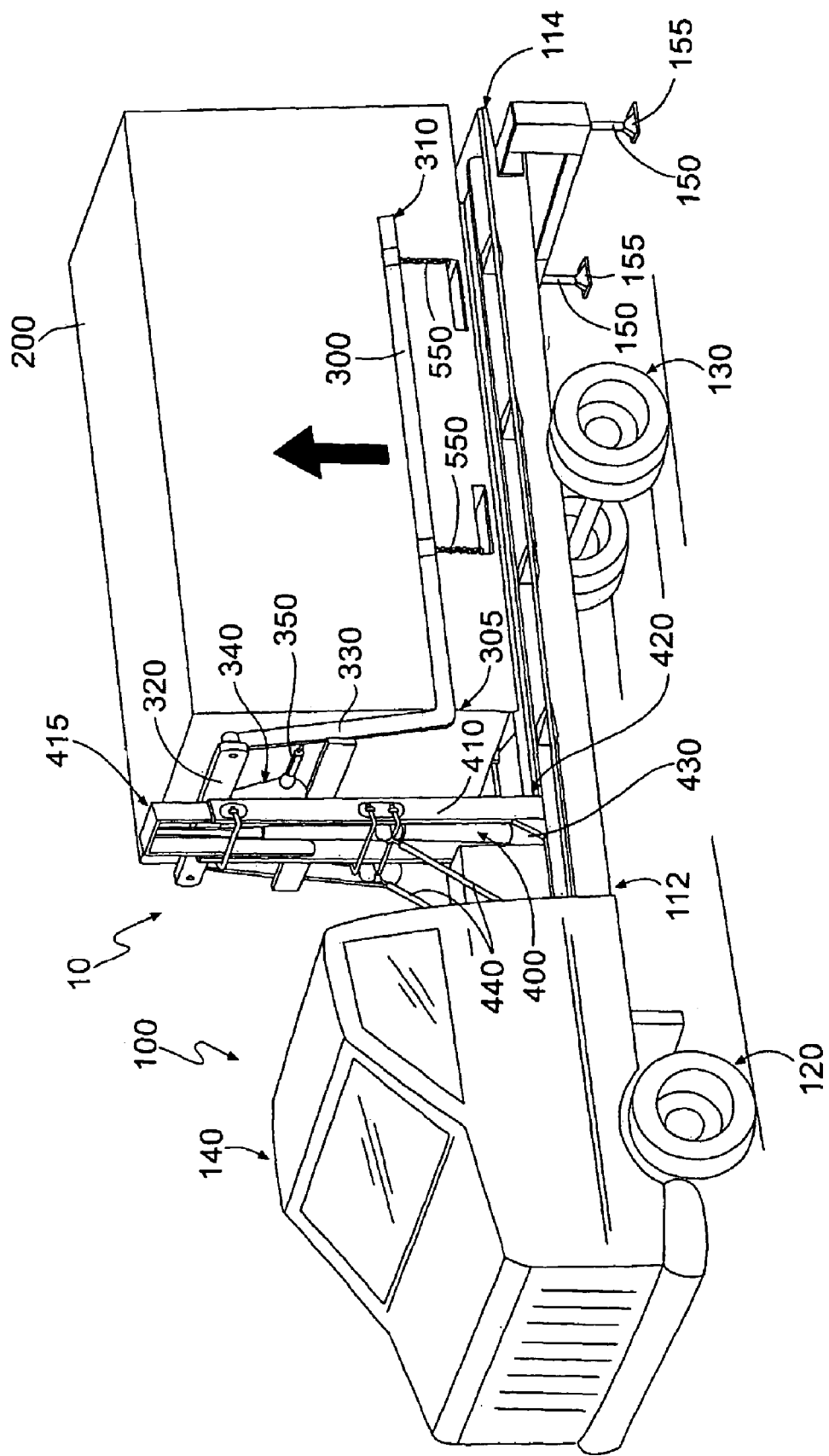

As previously described, the device 10 is configured to load, unload, and transport a portable storage container 200 with respect to a vehicle 100. As such, other advantageous aspects of the present invention include methods associated with loading and unloading the container 200 with respect to the vehicle 100. According to one advantageous aspect, as shown in FIG. 1, the container 200, when resting on and being supported by the vehicle frame 110 defines the widest part of the vehicle 100. In such a configuration, the lifting members 300 are disposed in a stowed position below the container 300, and generally above the wheels 120, 130, by appropriate positioning of the vertically-movable member 320 by the vertical movement device 400 and appropriate positioning of the lifting members 300 by the spacing actuator 340. In order to unload the container 200 from the vehicle 100, the spacing actuator 340 is first actuated to outwardly pivot the connecting members 330 so as to laterally space the lifting members 300 by at least the width of the container 200, as shown in FIG. 1. Once the lifting members 300 are sufficiently spaced apart, the vertical movement device 400 may be actuated to raise the lifting members 300 to at least the level of the bottom of the container 200. One or more tethers 550 comprising, for example, appropriate chains, straps, or the like, are then connected between each lifting member 300 and the lower end of the container 200 such that the container 200 is secured to and between the lifting members 300, as shown in FIG. 2. In some instances, a spacer 560 may be interposed between each tether 550 and the container 200, as shown, for example, in FIG. 13, wherein the spacer 560 is configured to move the container end of the respective tether 560 away from the container 200 so as to limit the extent to which the lifting members 300 may be drawn inward toward the container 200 due to the weight of the container 200 and thereby prevent damage to the container 200 from contact therebetween. One skilled in the art will note that, at some point before or during the unloading process, such as prior to moving the lifting members 300 from the stowed position, the support members 150 associated with the vehicle 100 may be deployed in order to level the vehicle frame 110 from side to side or forward to rearward, or in order to provide support for the rearward end 114 of the vehicle frame 110.

Figure 3:
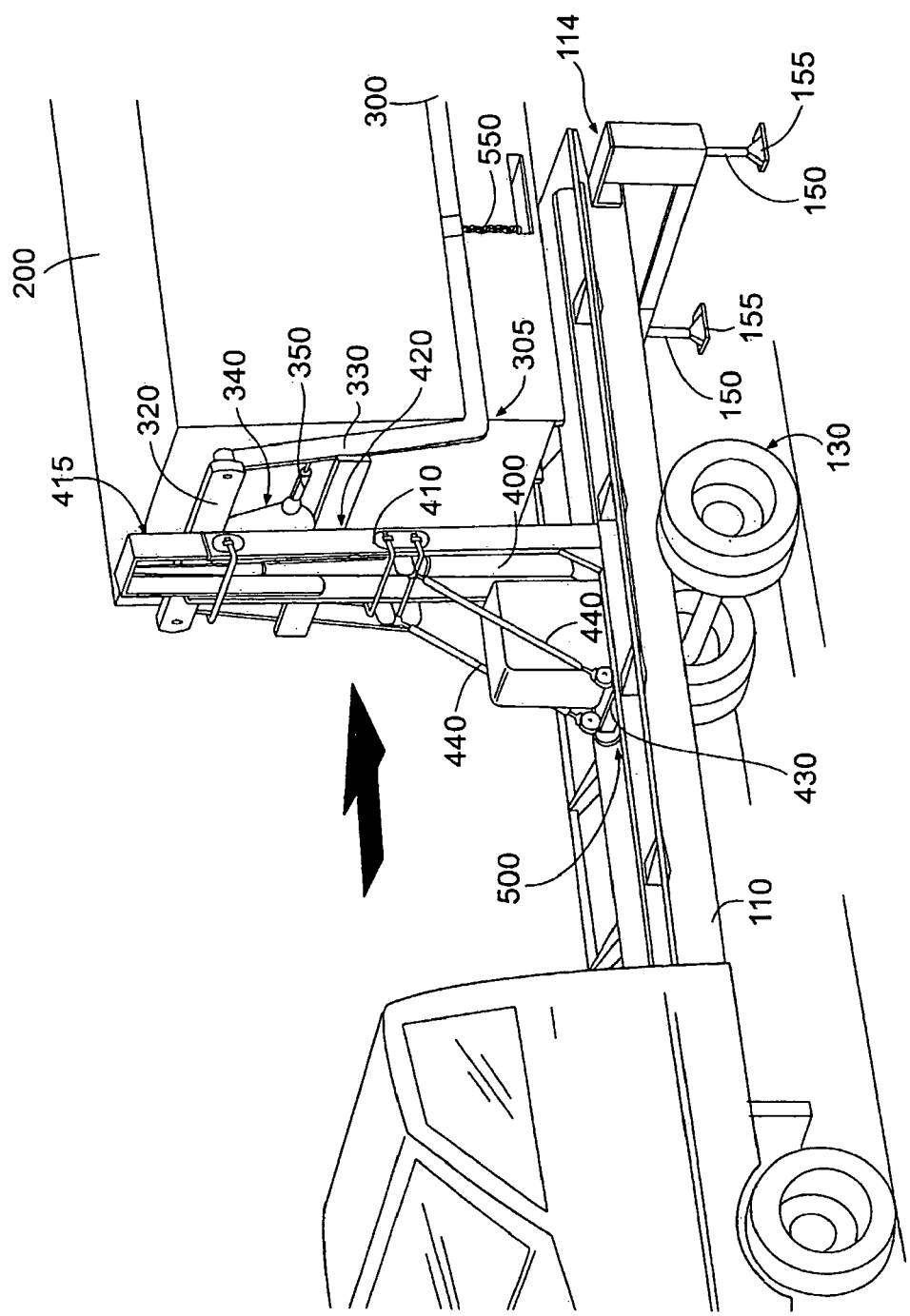
Figure 4:
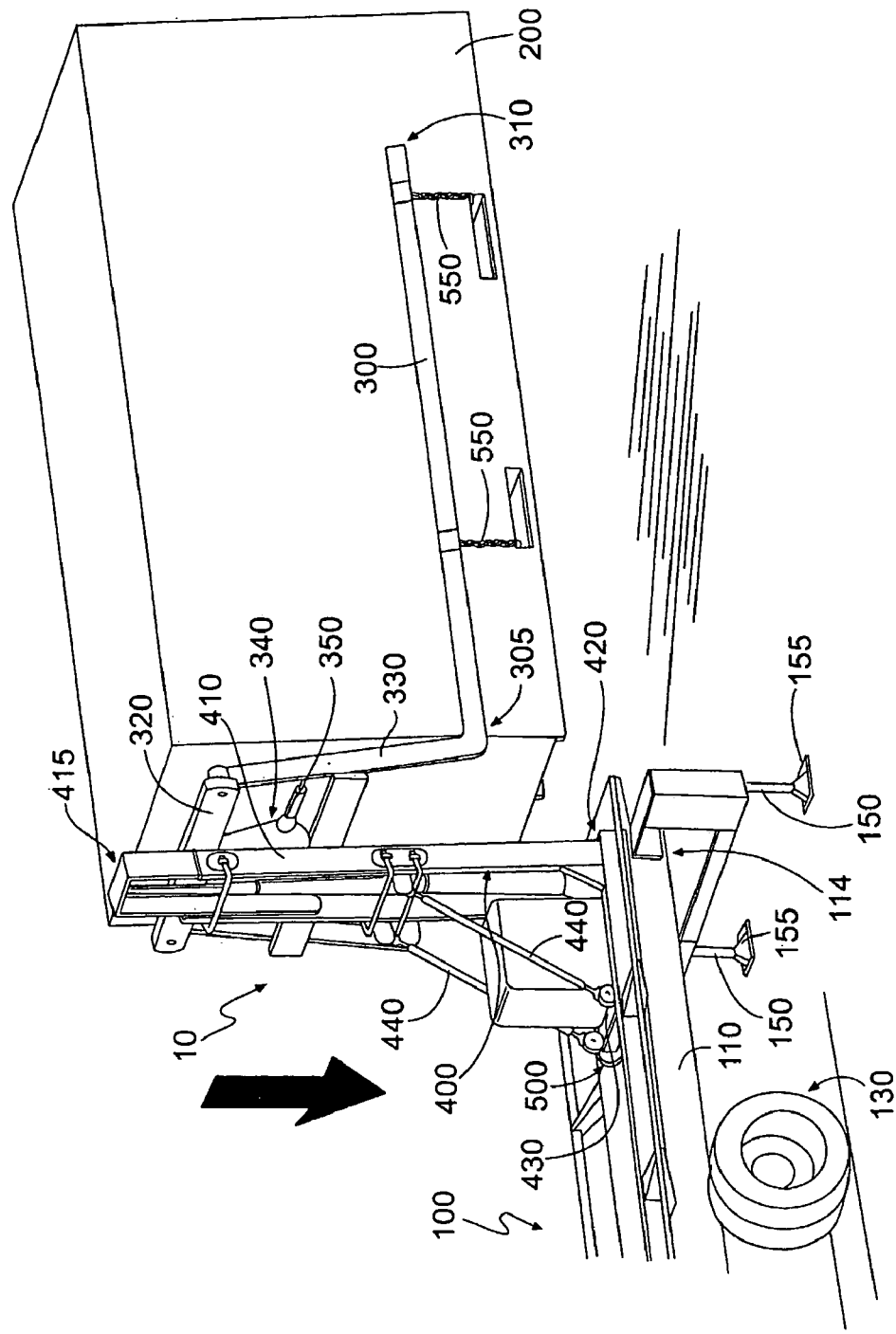
Figure 5:
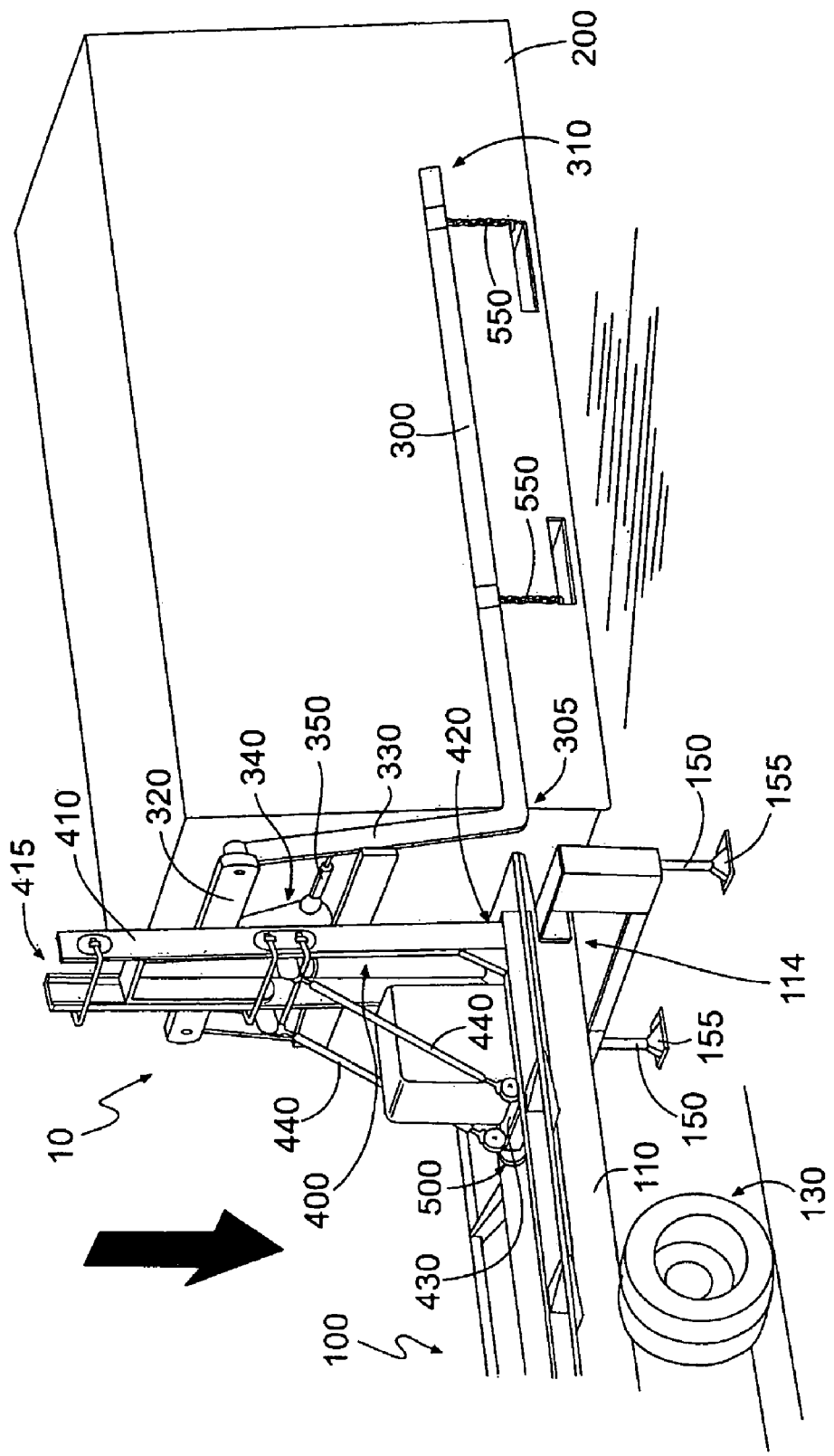
Figure 6:
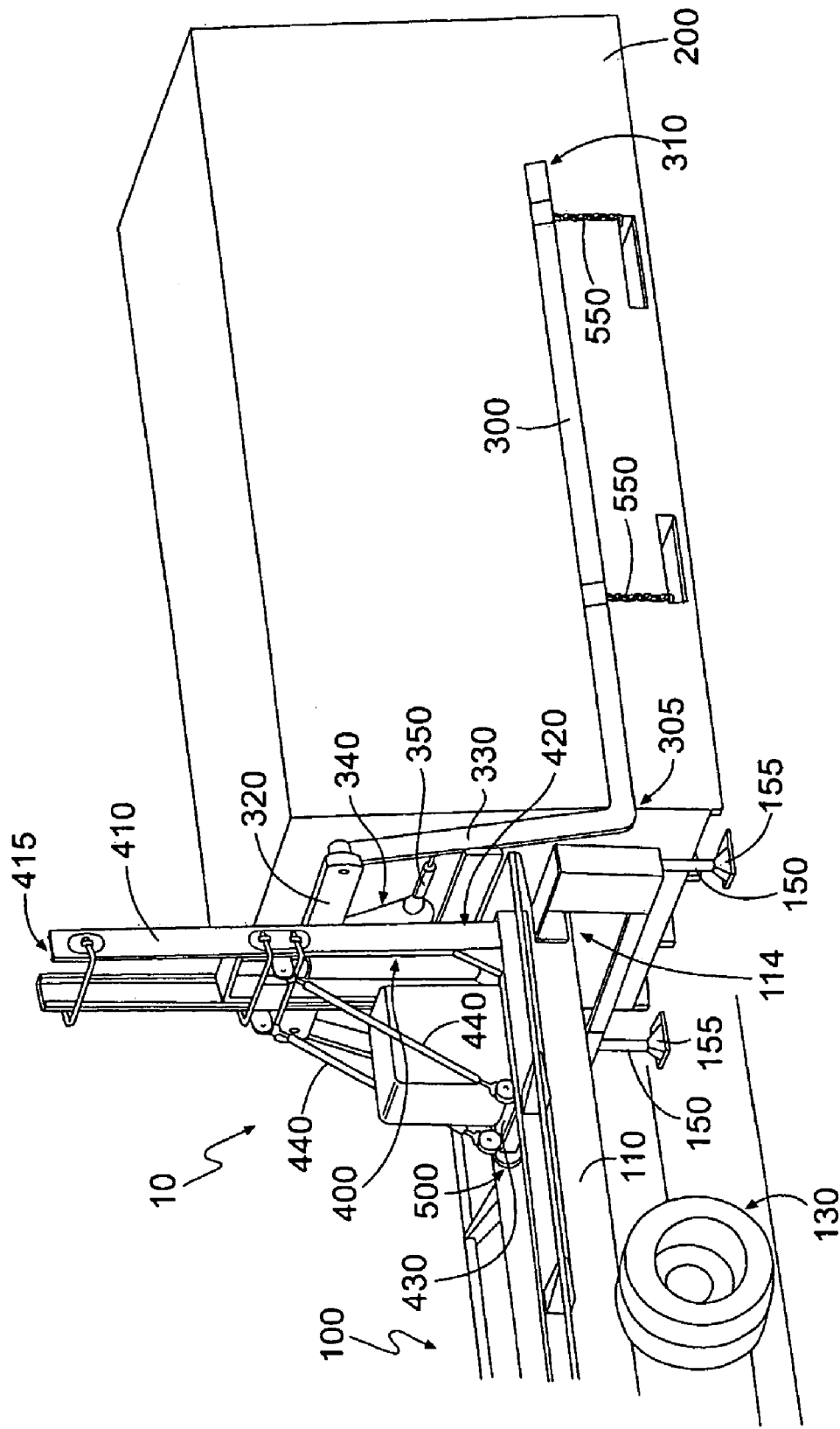

Once the tethers 550, and possibly the spacers 560, are engaged between the container 200 and the lifting members 300, the vertical movement device 400 is actuated to lift the lifting members 300 and thus raise the container 200 over the vehicle frame 110, as shown in FIG. 2. Once the container 200 clears the vehicle frame 110, the translatory device 500 is actuated to longitudinally move the lifting members 300 and the container 200 rearward along the vehicle 100, as shown in FIG. 3. When the container 200, and in some instances the vertically-movable member 320 and the lifting members 300, are moved past a vertical plane defined by the rearward end 114 of the vehicle 100, the translatory device 500 is deactuated and the vertical movement device 400 actuated so as to lower the container 200 to the ground, as shown in FIGS. 4-6. Once the container 200 is supported by the ground, the tethers 550 (and spacers 560, if any), are disengaged from the container 200 and lifting members 300. The vertical lifting device 400 and the translatory device 500 are then actuated to vertically and longitudinally move the vertically-movable member 320 and the lifting members 300 back toward the forward end 112 of the vehicle 100, whereafter the lifting members 300 are appropriately positioned back in the stowed position and the support members 150 retracted.

Figure 7:
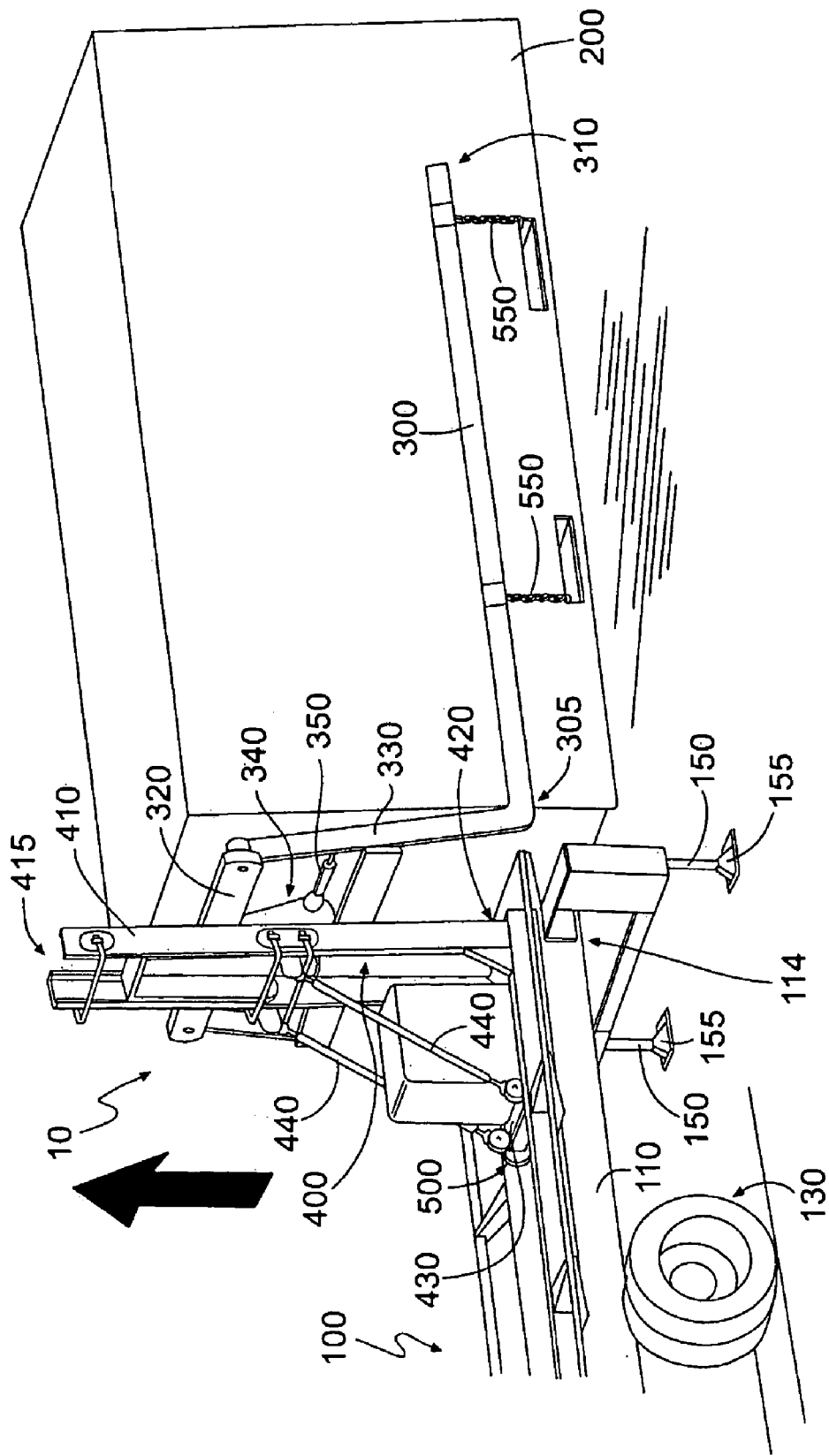
Figure 8:
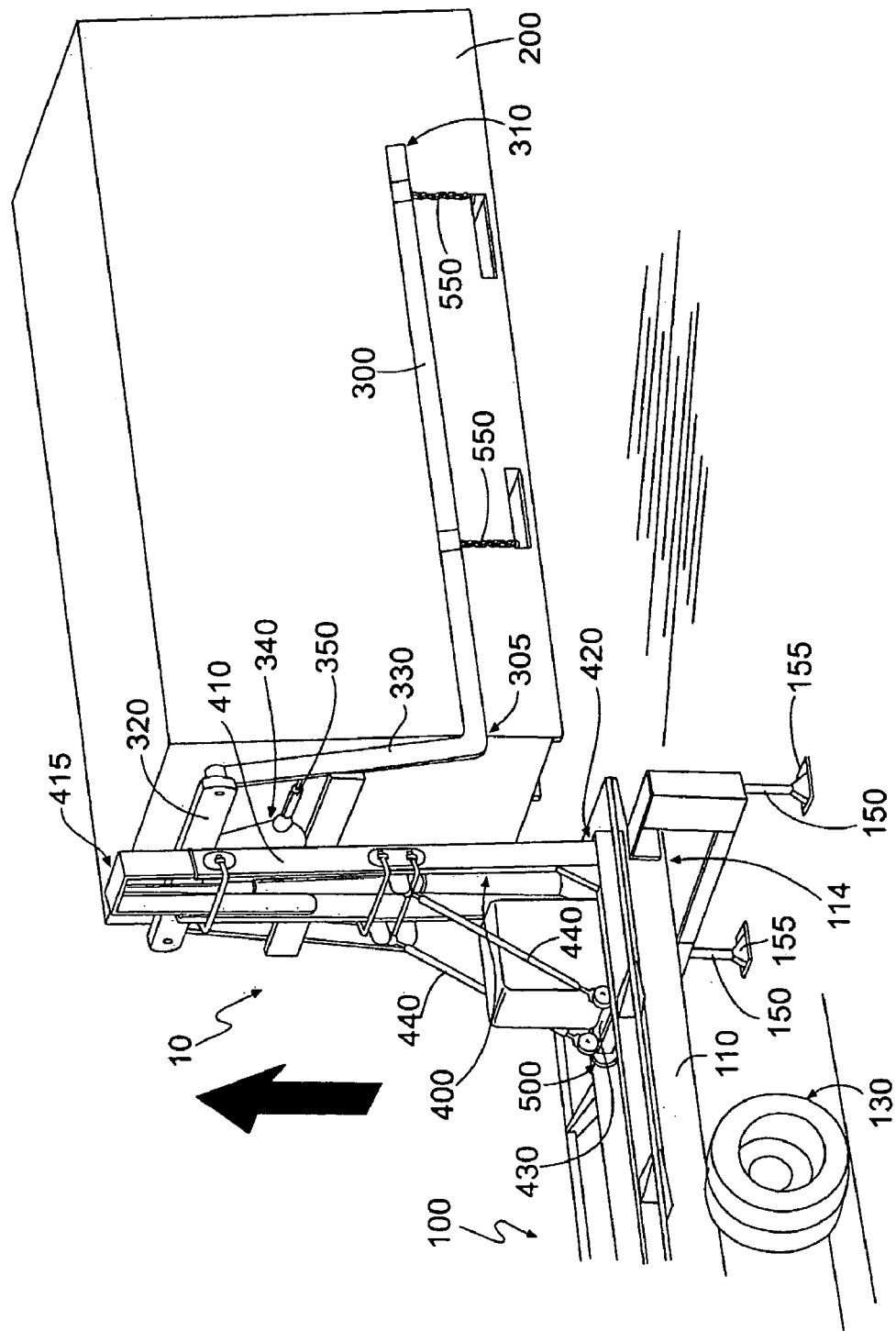
Figure 9:
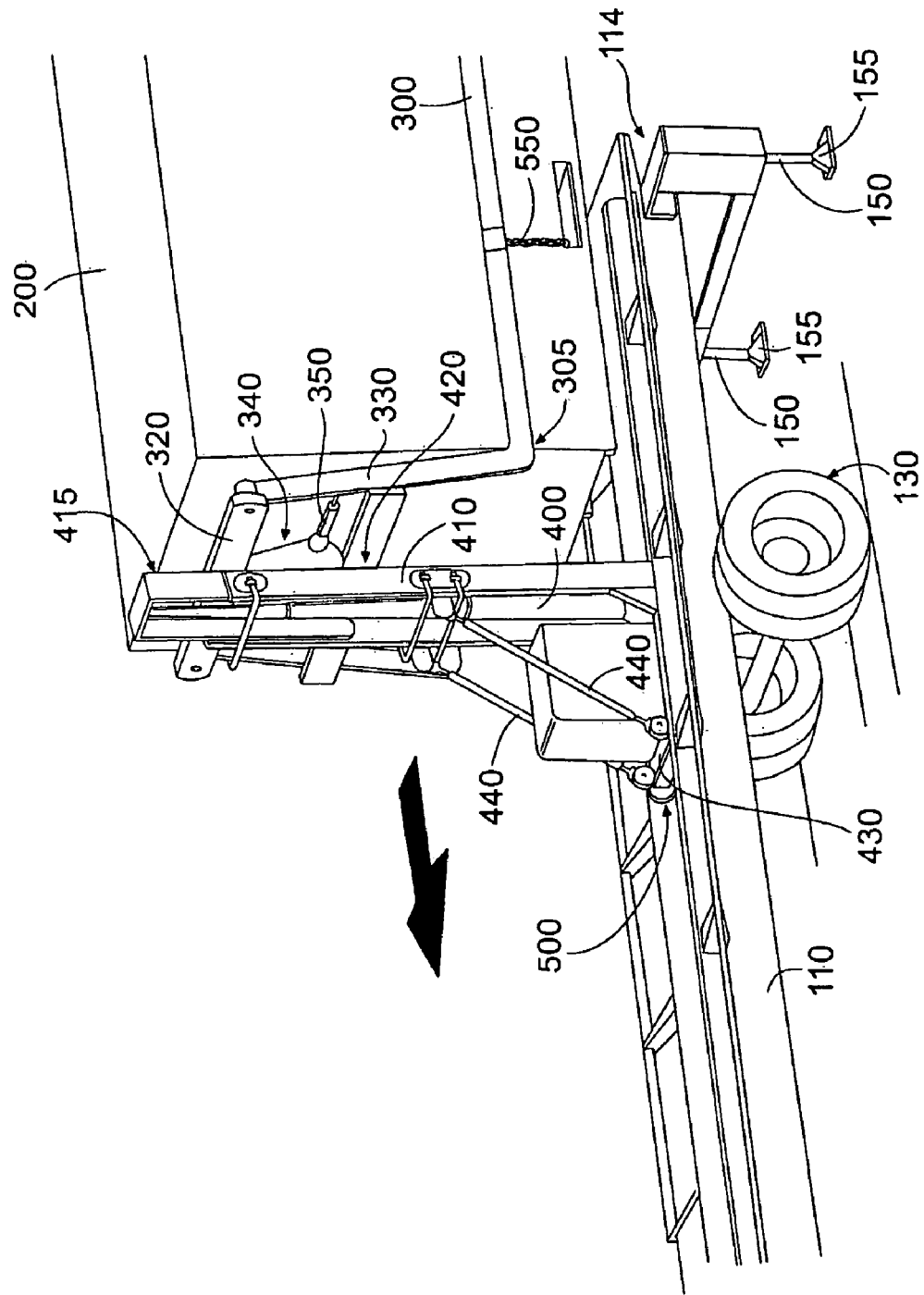
Figure 10:
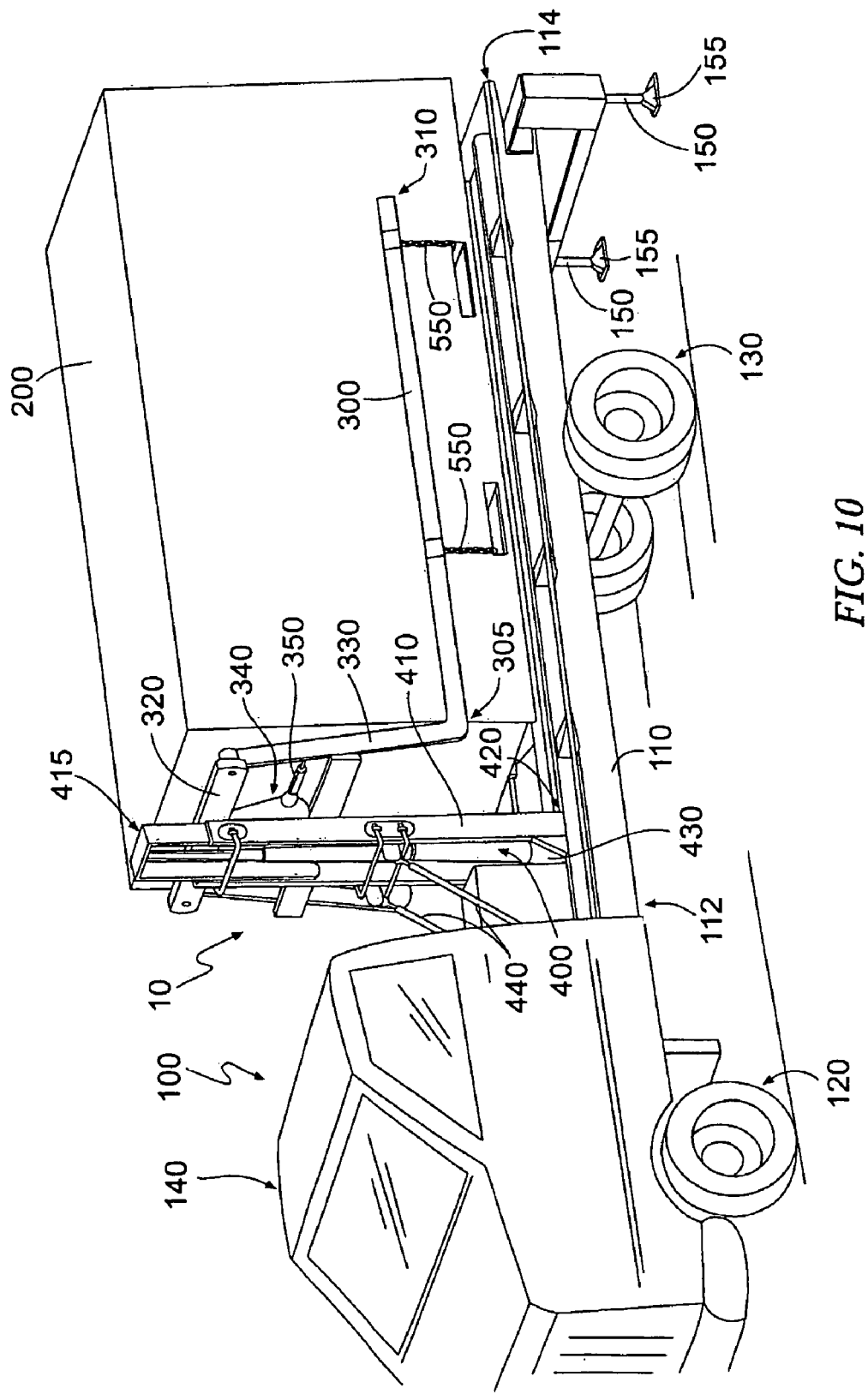
Figure 11:
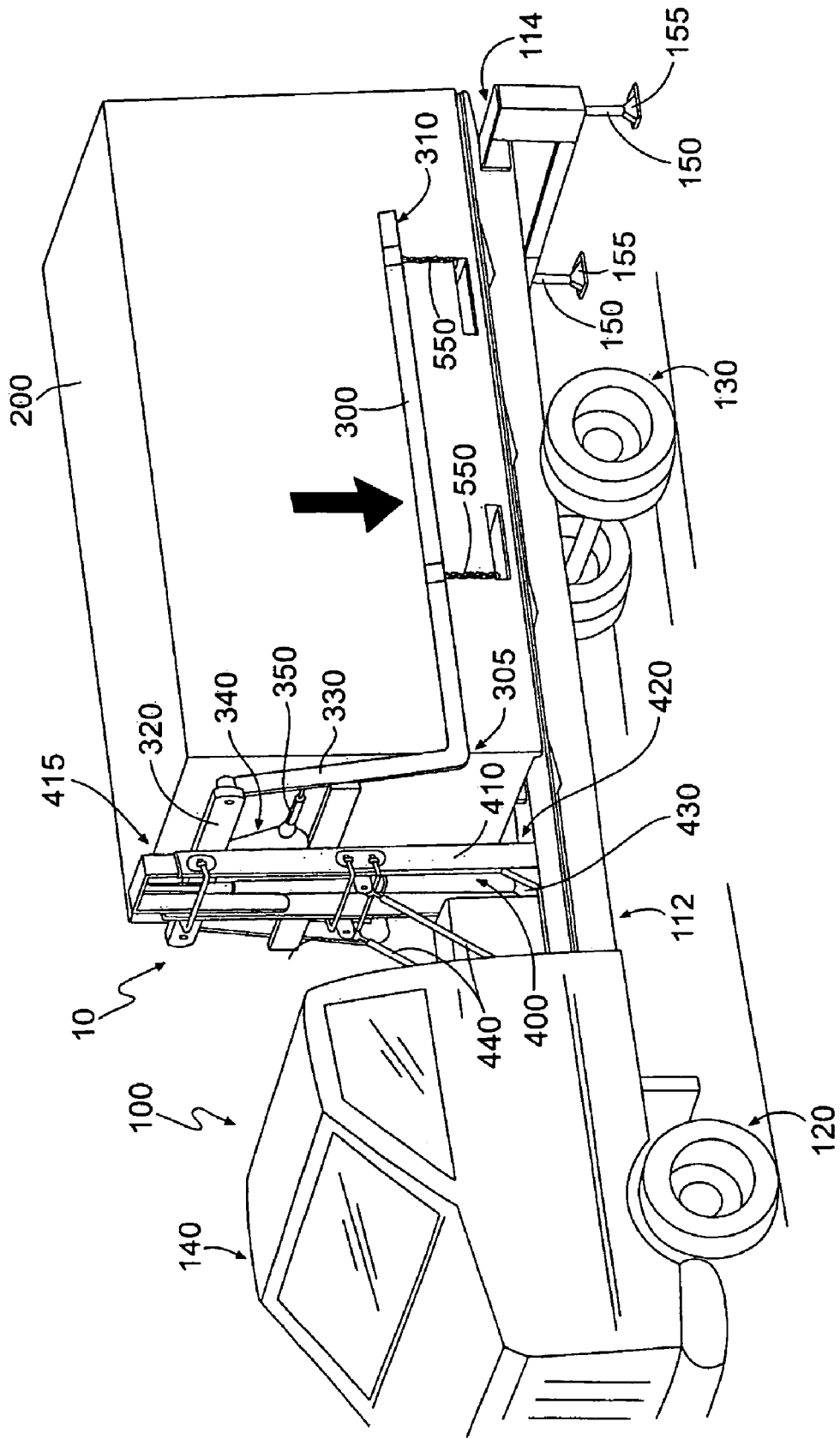
Figure 12:
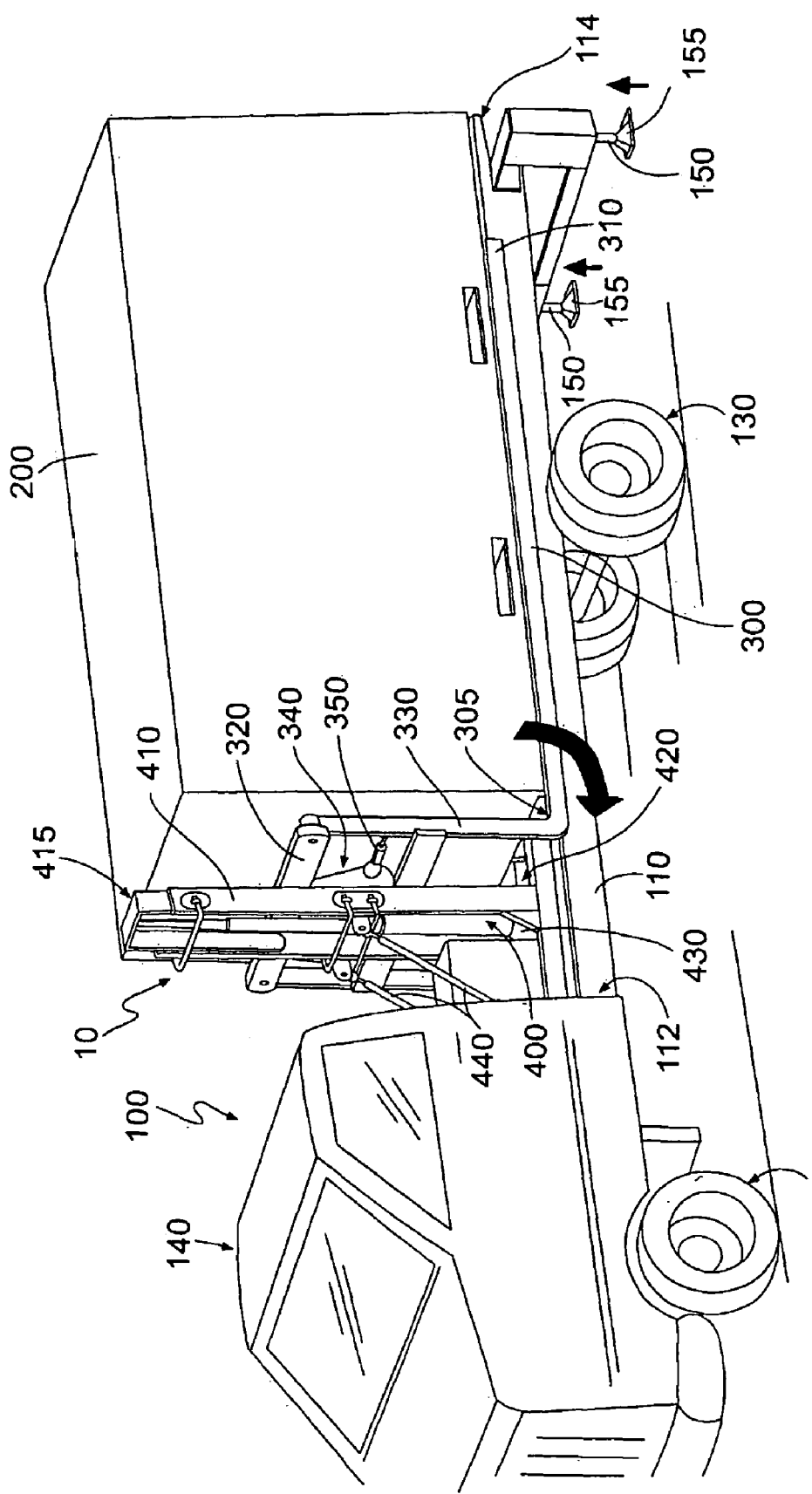

Though loading the container 200 onto the vehicle 100 is generally the reverse procedure with respect to the described unloading procedure, the loading procedure will be described herein for the sake of completeness. As such, in order to load the container 200, the vehicle 100 is reversed to a position adjacent to the container 200 and the support members 150 deployed. The vertical movement device 400 and the translatory device 500 are then actuated so as to move the lifting members 300 from the stowed position to a position adjacent to the sides of the container 200. The tethers 550 (and spacers 560, if any) are then engaged between the container 200 and the respective lifting members 300. Once the container 200 is secured to the lifting members 300, the vertical movement device 400 is actuated to raise the container 200 past a horizontal plane defined by the rearward end 114 of the vehicle 100, as shown in FIGS. 7 and 8. The translatory device 500 is then actuated to move the container 200 toward the forward end of the vehicle 100 such that, when the container 200 is disposed at an appropriate location above the vehicle frame 110, the translatory device 500 is deactuated and the vertical movement device 400 actuated so as to lower the container 200 onto the vehicle frame 110 whereby the container 200 is then supported by the vehicle 100 and is transportable thereby, as shown in FIGS. 9-11. The tethers 550 (and spacers 560, if any) are then removed from engagement with the container 220 and the lifting members 300 before the lifting members 300 are returned to the stowed position and the support members 150 retracted, as shown in FIG. 12.

One skilled in the art will also appreciate that embodiments of the device 10 as described herein may also be applicable and adapted to many different types of containers as well as other objects. For example, the device 10 may be adapted to be applicable to garbage or debris dumpsters, fuel tanks such as propane or LP gas tanks, other liquid or gas tanks, or many other containers, tanks, receptacles, or the like. In other instances, the device 10 may be adapted to be a vehicle lift and carrier. That is, the device 10 may be adapted to be a car carrier where the lifting members 300 may be configured as one or more flat platforms or other suitable supports on which a car, truck, or other vehicle may be loaded, unloaded, and transported on the vehicle 100 using appropriately configured mechanisms and methods as described herein. As such, it will be appreciated that embodiments of the device 10 may be adapted, configured, or used for many other situations, devices, or purposes in addition to or in the alternative to that described herein within the spirit and scope of the present invention.

An alternate embodiment of a device 10 according to the present invention is shown in FIGS. 14-20. As shown, such an alternate embodiment of the device 10 includes a pair of opposing horizontal frame members 600 operably engaged with the vehicle frame 110 and extending rearward from the cab 120, with each horizontal frame member 600 having a forward end 605 and a rearward end 610. Each horizontal frame member 600 further includes a horizontal sliding member 620 slidably engaged therewith, wherein each horizontal sliding member 620 has a forward end 625 and a rearward end 630 and is at least as long as the container 200. Each end 625, 630 of each horizontal sliding member 620 has a vertical post member 640 extending upwardly therefrom. The vertical post members 640 at the forward ends 625 and the rearward ends 630 of the horizontal sliding members 620 may be connected by a first and a second upper transverse member 645, 650, respectively, while the horizontal frame members 600 and/or the horizontal sliding members 620 may be connected by a lower transverse member 660. The upper transverse members 645, 650 are further configured to be expandable, as is the lower transverse member 660. At least one of the upper transverse members 645, 650 and the lower transverse member 660, such as the lower transverse member 660, includes an actuator (not shown) operably engaged therewith and configured to selectively expand and contract the lower transverse member 660. The actuator may comprise, for example, an appropriate hydraulic system, a chain/sprocket arrangement, electric or pneumatic devices, or other suitable device, as will be appreciated by one skilled in the art. As such, adjustment of the transverse dimension of the lower transverse member 660 by the actuator thereby results in a corresponding transverse adjustment in the remainder of the transverse members 645, 650 such that the horizontal frame members 600, the corresponding horizontal sliding members 620, and the vertical post members 640 can be laterally spaced to accommodate the container 200 therebetween.

A horizontal lifting member 680 extends between the vertical post members 640 at the forward and rearward ends 625, 630 of each horizontal sliding member 620, wherein the horizontal lifting member 680 is configured to be vertically movable along the respective vertical post members 640. For example, the respective vertical post members 640 may include, for example, opposing slots 685 extending therealong so as to guide the corresponding ends of the horizontal lifting member 680 as the horizontal lifting member 680 is vertically moved with respect to the vertical post member 640. In one embodiment, each horizontal lifting member 680 further includes a pulley (not shown) at each end thereof. One or more tethers 550 such as, for example, chains, straps, or the like, extend between the horizontal lifting members 680 and the container 200 such that the container 200 is secured between the horizontal lifting members 680 and between the four vertical post members 640. In one instance, one of the vertical post members 640 at a forward end 625 of a horizontal sliding member 620 includes a lift actuator (not shown) operably engaged therewith and capable of extending along the vertical post member 640, wherein such a lift actuator may comprise, for example, an appropriate hydraulic system, a chain/sprocket arrangement, electric or pneumatic devices, or any other suitable device. On each side of the device 10, according to one embodiment of the present invention, a chain (not shown) is fixedly engaged with the upper end of the vertical post member 640 at the rearward end 630 of the respective horizontal sliding member 620. The chain extends around the pulley at the proximate end of the horizontal lifting member 680, around the pulley at the opposite end of that horizontal lifting member 680, and to the lift actuator. Accordingly, the lift actuator and chain(s) are configured that actuation of the lift actuator such as, for example, the extension of a hydraulic ram, causes the chain(s) to lift the horizontal lifting members 680 toward the upper ends of the vertical post members 640 so as to lift the container 200 which is secured to the horizontal lifting members 680 by the tethers 550.

According to one embodiment of the present invention, each of the vertical post members 640 at the rearward ends 630 of the horizontal sliding members 620 further include an independently actuatable leveling device 700 configured to maintain the horizontal sliding member 620 substantially parallel to the horizontal frame member 600 as the horizontal sliding member 620 is extended off the horizontal frame member 600 and the rearward end 114 of the vehicle frame 110. Each leveling device 700 includes an extendable member 710 having a directionally-fixed wheel 720 attached to the lower end thereof. A proximity sensor (not shown) is engaged between the horizontal frame member 600 and the horizontal sliding member 620 and is configured to appropriately provide a signal to or otherwise direct the respective leveling device 700 to extend or retract the extendable member 710 to maintain the horizontal sliding member 620 level with the horizontal frame member 600 as the horizontal sliding members 620 are extended off the rearward end 114 of the vehicle frame 110.

In a container-loading procedure, the vehicle 100 is first backed up to a container 200 resting on the ground. Once the vehicle 100 is properly positioned, the support members 150 attached to the vehicle frame 110, of which in this example are four in number with one at each corner of the vehicle frame 110, are extended and adjusted so as to level the vehicle frame 110 with respect to the ground and so as to allow the upper transverse members 645, 650 to clear the top of the container 200. The actuator associated with the first lower transverse member 660 is then adjusted such that the distance between the horizontal sliding members 620 is sufficient to accommodate the container 200 therebetween. The horizontal sliding members 620 are then extended longitudinally rearward from the horizontal frame members 600 and off the rearward end 114 of the vehicle frame 110 until the vertical post members 640 generally correspond to the corners of the container 200. Generally concurrently with the extension of the horizontal sliding members 620, the leveling devices 700 associated with the vertical post members 640 at the rearward ends 630 of the horizontal sliding members 620 are deployed so as to maintain the horizontal sliding members 620 level with the horizontal frame members 600 and thus the vehicle frame 110, as shown in FIG. 14.

Figure 14:
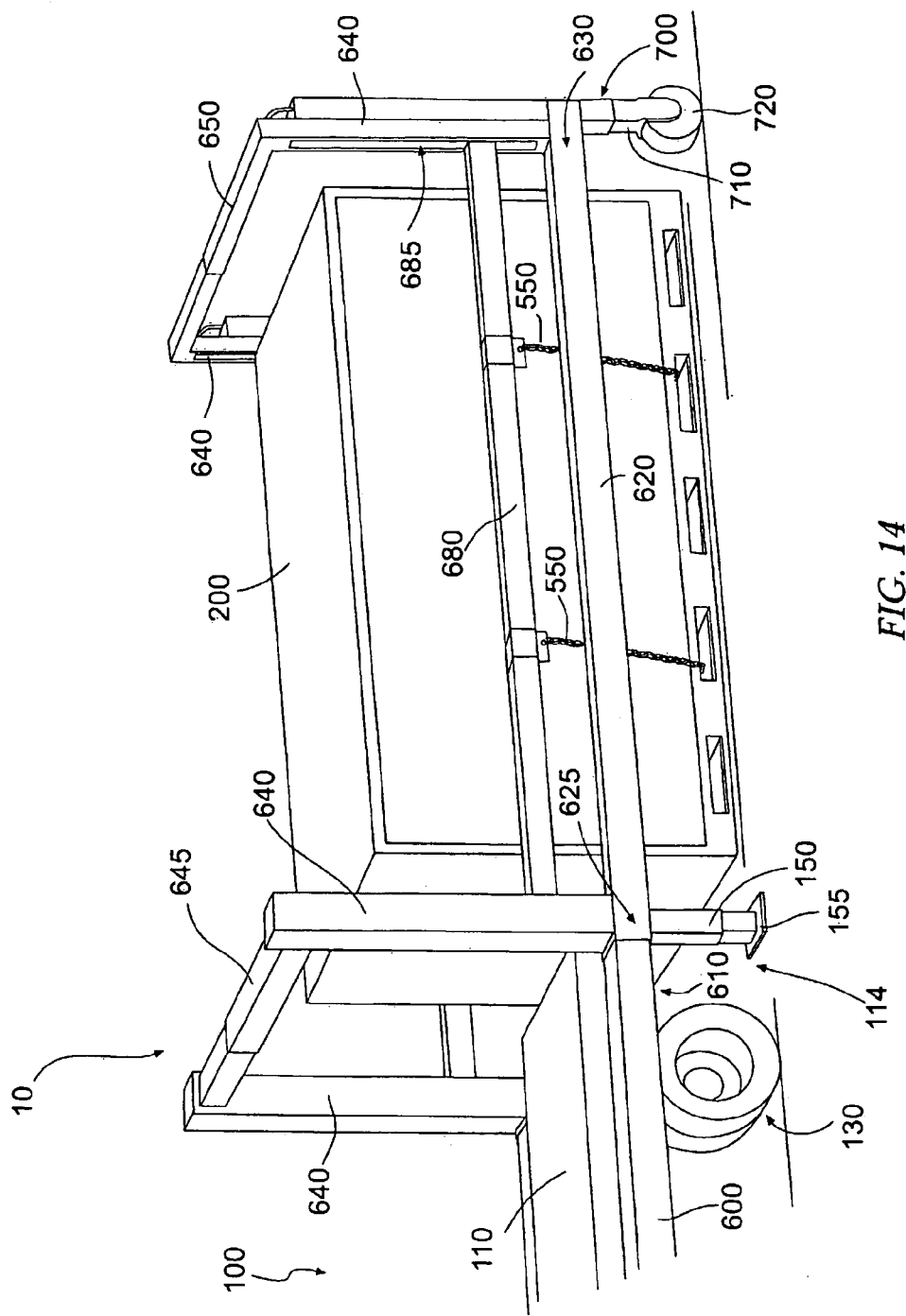
Figure 15:
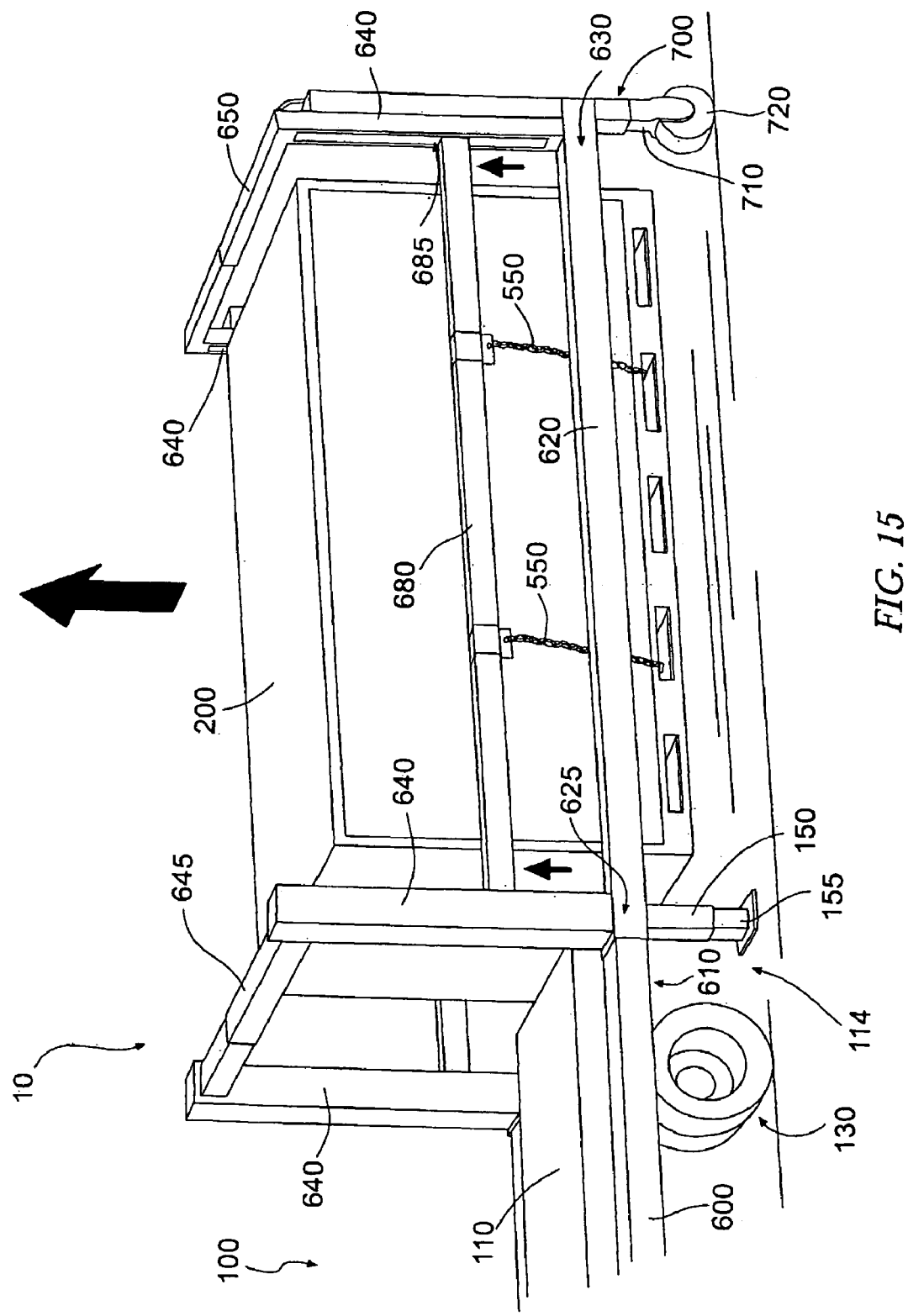
Figure 16:
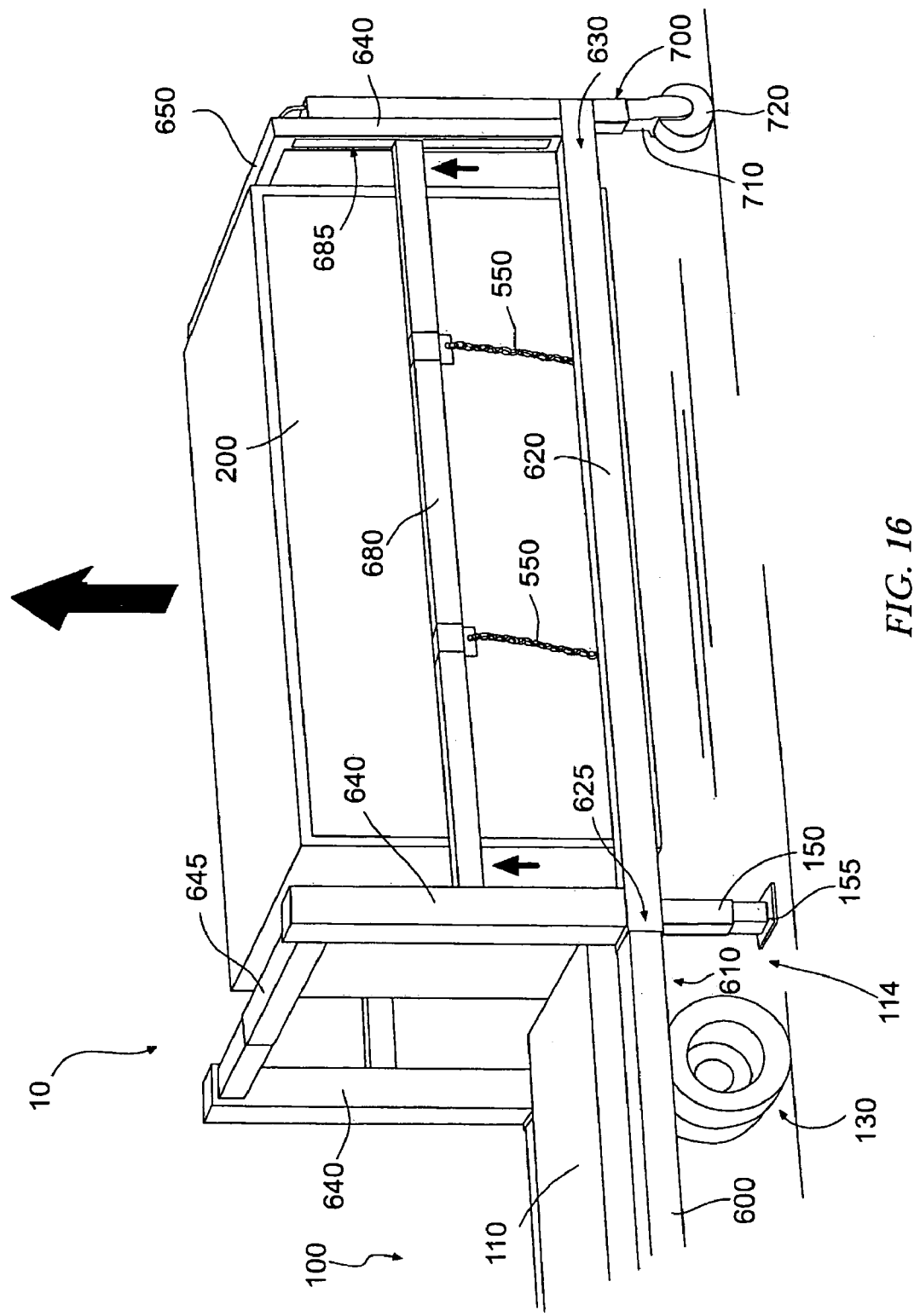
Figure 17:
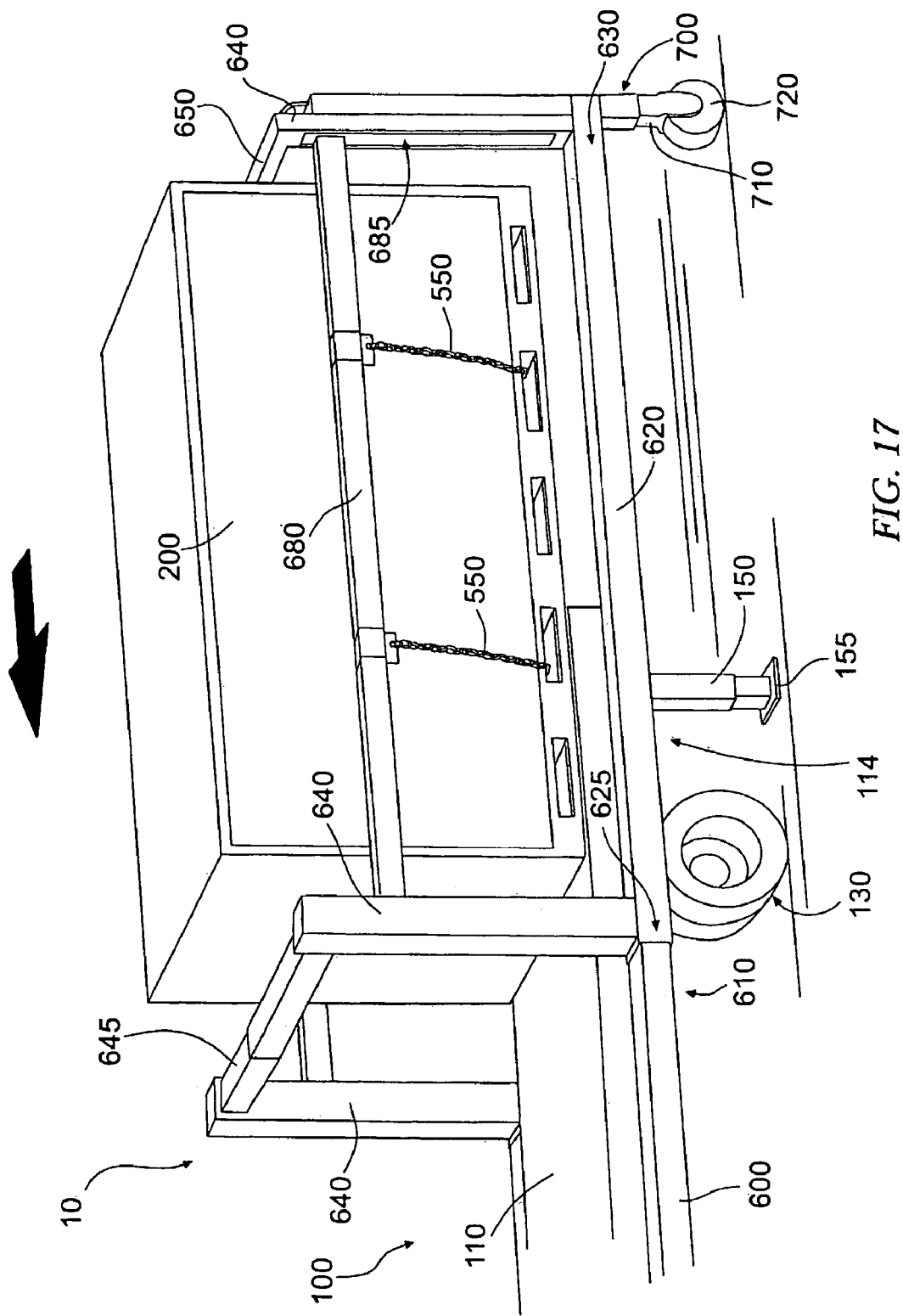
Figure 18:
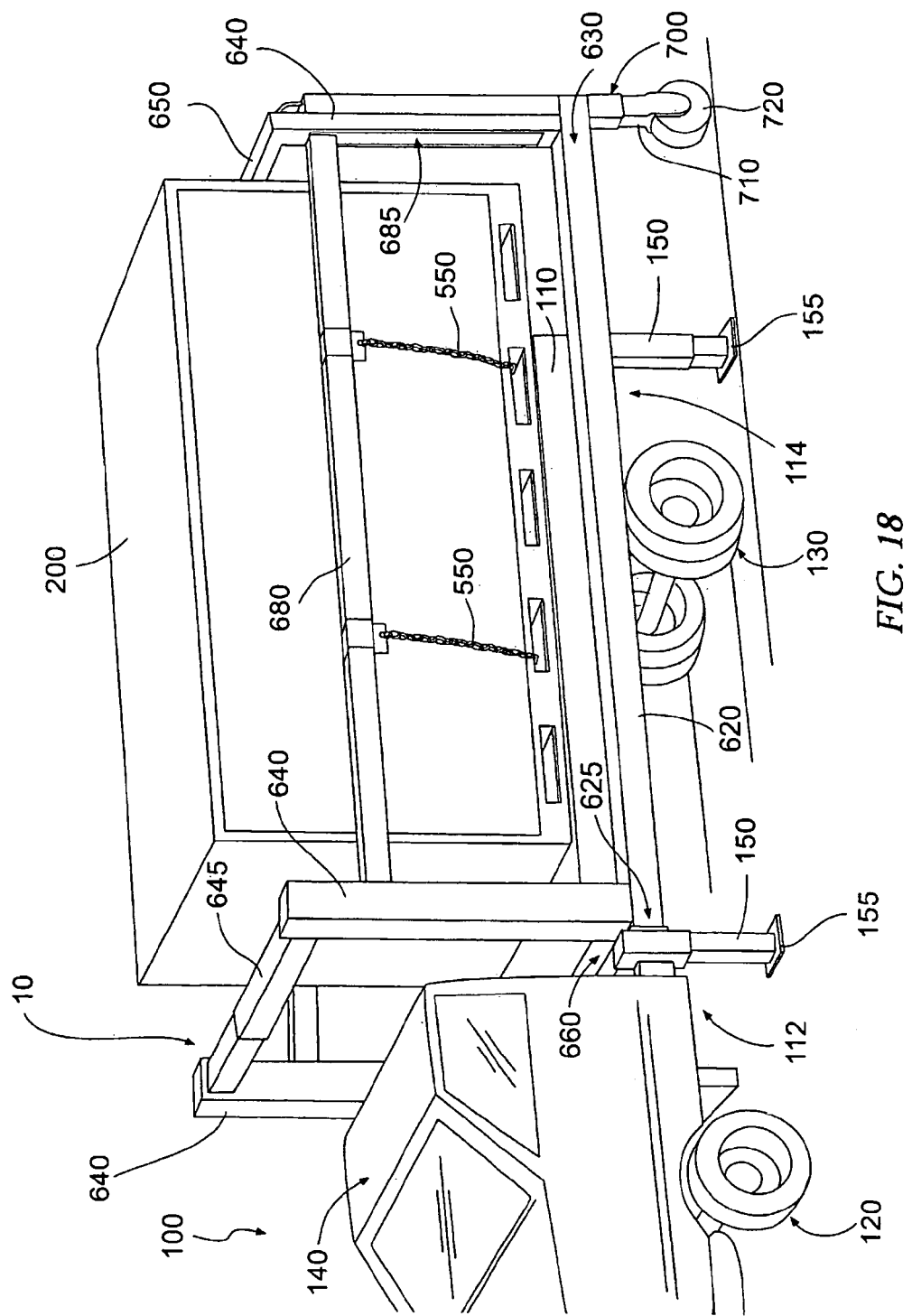
Figure 19:
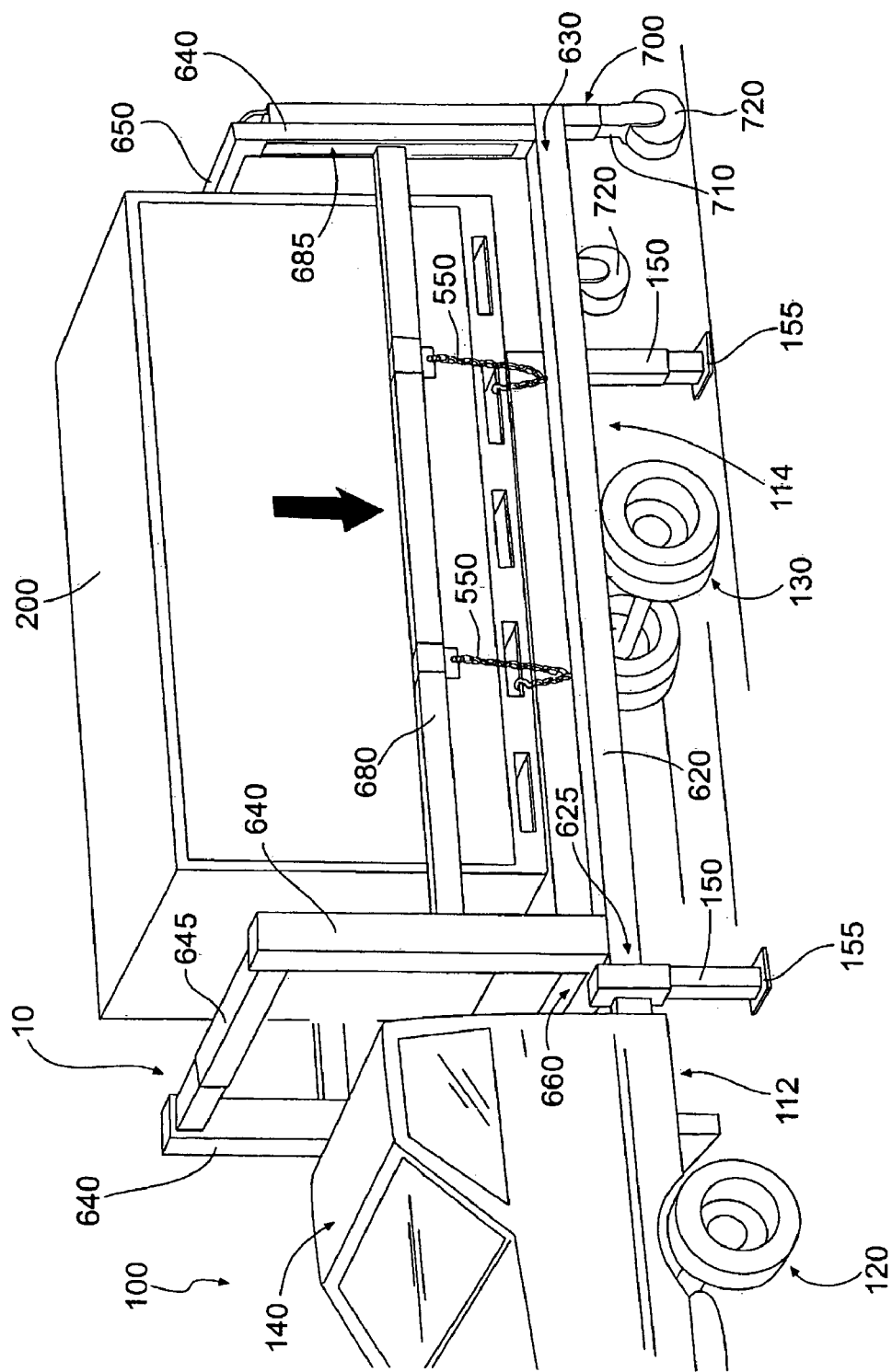
Figure 20:
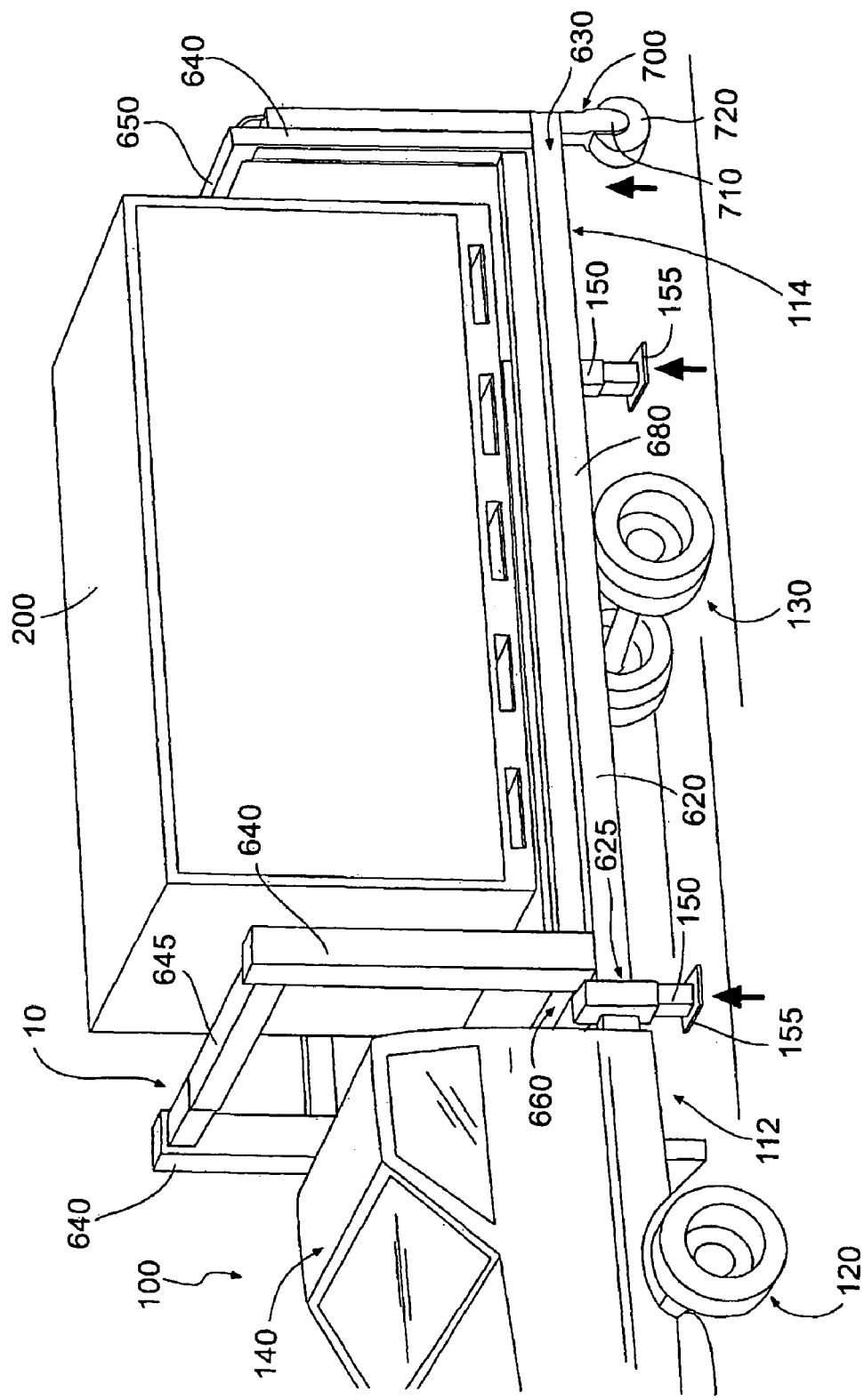

If necessary, the lift actuator associated with the vertical post members 640 is adjusted such that the horizontal lifting members 680 are at a sufficient height with respect to the container 200 so as to allow the necessary tethers 550 to be connected between the container 200 and the horizontal lifting members 680, as further shown in FIG. 14. The lift actuator associated with the vertical post members 640 is then actuated so as to raise the horizontal lifting members 680, and thus the container 200, toward the upper ends of the vertical post members 640, as shown in FIGS. 15 and 16. At the same time, the leveling devices 700 actively maintain the horizontal sliding members 620 level with the horizontal frame members 600 and the vehicle frame 110. Once the container 200 is sufficiently raised past a horizontal plane defined by the vehicle frame 110, the horizontal sliding members 620 are retracted toward the forward end 112 of the vehicle 100 so as to draw the container 200 over the vehicle frame 110, as shown in FIGS. 17 and 18. Once the container 200 is in place over the vehicle frame 110 (where the horizontal sliding members 620 are fully retracted with respect to the horizontal frame members 600), the horizontal lifting members 680 are lowered by the lift actuator so as to rest the container 200 on the vehicle frame 110 such that the container 200 is supported thereby, as shown in FIG. 19. The leveling devices 700 associated with the vertical post members 640 at the rearward ends 630 of the horizontal sliding members 620 are then retracted. The support members 150 associated with the vehicle frame 110 are also retracted, as shown in FIG. 20. The container 200 is then capable of being transported by the vehicle 100. Deployment of the container 200 is further accomplished by generally reversing the steps of the described loading procedure and thus is not explicitly described herein.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of unloading a storage container from a transport vehicle to a surface, the vehicle including a vehicle frame for supporting the storage container at a transport position thereon, the vehicle frame having a forward end and a rearward end, said method comprising:

raising the container from the transport position thereof over the vehicle frame with a pair of horizontal lifting members each having a forward end and a rearward end, the forward ends of the lifting members being operably engaged by a vertically movable member such that the lifting members are vertically movable in correspondence therewith and such that the rearward ends of the lifting members are unsupported, the lifting members being laterally separated by at least a width of the container and being operably engaged with the container via a tether;

moving the lifting members longitudinally rearward along the vehicle frame with a translatory device operably engaged between the vertically-movable member and the vehicle frame until the container extends past a vertical plane defined by the rearward end of the vehicle frame;

lowering the lifting members so as to lower the container to the surface;

disengaging the tethers form the container;

moving the lifting members longitudinally forward along the vehicle frame toward the forward end thereof; and stowing the lifting members relative to the vehicle frame so the lifting members are positioned below the storage container when in the transport position thereon.

2. A method according to claim 1 further comprising independently actuating a plurality of support members operably engaged with the vehicle frame so as to level the vehicle frame with respect to the surface before raising the container over the vehicle frame.

3. A method according to claim 1 wherein raising the container over the vehicle frame and lowering the lifting members further comprise actuating a lifting actuator operably engaged with at least one of the vertically-movable member and the lifting members so as to vertically move the lifting members with respect to the vehicle frame.

4. A method according to claim 1 wherein moving he lifting members longitudinally along the vehicle frame further comprises actuating a translatory actuator operably engaged with the translatory device so as to longitudinally move the vertically-movable member and the lifting members with respect to the vehicle frame.

5. A method according to claim 1 further comprising actuating a spacing actuator operably engaged with a connecting member operably engaged between the vertically-movable member and each lifting member, the connecting member being pivotably engaged with the vertically-movable member and fixedly engaged with the respective lifting member, so as to pivot the lifting members with respect to the vertically-movable member and adjust the lateral separation of the lifting members.

6. A method of loading a storage container having sides onto a transport vehicle from a surface with a pair of horizontal lifting members each having a forward and a rearward end, the lifting members being operably engaged at the front ends thereof by a vertically-movable member and being configured to be vertically-movable with respect to the vehicle and in correspondence with the vertically-movable member, the vehicle having a frame which defines a forward end and a rearward end, said method comprising:

moving the lifting members longitudinally rearward along the vehicle frame, with a translatory device operably engaged between the vehicle frame and the lifting members, and past a vertical plane defined by the rearward end thereof;

lowering the lifting members until the lifting members are disposed on either side of and adjacent the container;

operably engaging a tether between each lifting member and the container so as to secure the container thereto;

raising the lifting members so as to raise the container from the surface and past a horizontal plane defined by the rearward end of the vehicle frame;

moving the lifting members longitudinally forward along the vehicle frame with the translatory device until the container is disposed over a transport position on the vehicle frame;

lowering the lifting members so as to lower the container onto the transport position of the vehicle frame such that the container is supported thereby; and stowing the lifting members relative to the vehicle frame so the lifting members are positioned below the storage container when in the transport position thereon.

7. A method according to claim 6 further comprising independently actuating a plurality of support members operably engaged with the vehicle frame so as to level the vehicle frame with respect to the surface before raising the lifting members to raise the container from the surface.

8. A method according to claim 6 wherein raising and lowering the lifting members further comprise actuating a lifting actuator operably engaged with at least one of the vertically-movable member and the lifting members so as to vertically move the lifting members with respect to the vehicle frame.

9. A method according to claim 6 wherein moving the lifting members longitudinally along the vehicle frame further comprises actuating a translatory actuator operably engaged with the translatory device so as to longitudinally move the vertically-movable member and the lifting members with respect to the vehicle frame.

10. A method according to claim 6 further comprising actuating a spacing actuator operably engaged with a connecting member operably engaged between the vertically-movable member and each lifting member, the connecting member being pivotably engaged with the vertically-movable member and fixedly engaged with the respective lifting member, so as to pivot the lifting members with respect to the vertically-movable member and adjust the lateral separation of the lifting members.

11. A method according to claim 6 wherein the tether has a container end and a lifting member end and operably engaging a tether between each lifting member and the container further comprises operably engaging the container end of the tether with a spacer operably engaged with the container, the spacer being configured to space the container end of the tether away from the container.

12. A method for transporting a container supported on a vehicle frame to a delivery site, and thereafter unloading the container from the vehicle frame onto a container-supporting surface at the delivery site, the method comprising:

(a) providing a transport vehicle capable of transporting the container to the delivery site and unloading the container at the delivery site, the transport vehicle having a vehicle frame with a forward end and a rearward end between which the container is supported when the container is loaded onto and transported by the vehicle, the vehicle frame being configured such that a widthwise dimension of the container is greater than a widthwise dimension of the vehicle frame, the transport vehicle having a vertical movement device having a vertically-movable member capable of vertical movements relative to the vehicle frame, a pair of horizontal lifting members each having an unsupported rearward end and a forward end which is operably engaged with the vertically-movable member of the vertical movement device to move the lifting members vertically in response to vertical movements of the vertically-movable member, a spacing device operatively connecting the forward ends of the lifting members to the vertical movement device for moving the lifting members laterally towards and away from one another, and a translatory member for longitudinally moving the container between a transport position thereof wherein the container is positioned over the vehicle frame and a loading/unloading position thereof wherein the container is positioned rearwardly of the vehicle frame;

(b) transporting the container while supported on the vehicle frame to the delivery site such that, during transport of the container on the vehicle frame to the delivery site, the lifting members of the transport vehicle are in the stowed position adjacent the vehicle frame so as to be positioned below the container;

(c) positioning the transport vehicle so that the rearward end of the vehicle frame is adjacent the container-supporting surface at the delivery site;

(d) operating the spacing device so as to move the lifting members laterally from the stowed position thereof to a lifting position wherein the lifting members are positioned laterally outside the container, and while in the lifting position;

(e) operatively connecting the lifting members to the container while the lifting members are in the lifting position thereof;

(f) operating the vertically-movable member so as to move the lifting members to a raised position so that the container is raised above the vehicle frame;

(g) operating the translatory member while the lifting members are in the raised position so as to move the container from the transport position thereof to the loading/unloading position thereof, and thereafter (h) operating the vertically-movable member so as to vertically move the lifting arms and the container supported thereby from the raised position to a lowered position thereof, whereby the container is lowered to the container-supporting surface at the delivery site.

13. A method for loading a container onto a vehicle frame from a container-supporting surface at a delivery site, and thereafter transporting the container while supported by the vehicle frame away from the delivery site, the method comprising:

(a) providing a transport vehicle having a vehicle frame with a forward end and a rearward end between which the container is supported when the container is loaded onto and transported by the vehicle, the vehicle frame being configured such that a widthwise dimension of the container is greater than a widthwise dimension of the vehicle frame, the transport vehicle having a vertical movement device having a vertically-movable member capable of vertical movements relative to the vehicle frame, a pair of horizontal lifting members each having an unsupported rearward end and a forward end which is operably engaged with the vertically-movable member of the vertical movement device to move the lifting members vertically in response to vertical movements of the vertically-movable member, a spacing device operatively connecting the forward ends of the lifting members to the vertical movement device for moving the lifting members laterally towards and away from one another, and a translatory member for longitudinally moving the container between a transport position thereof wherein the container is positioned over the vehicle frame and a loading/unloading position thereof wherein the container is positioned rearwardly of the vehicle frame;

(b) positioning the transport vehicle relative to the container at the container-supporting surface so that the rearward end of the vehicle frame is adjacent the container;

(c) operating the vertically movable and translatory members so as to position the lifting members at a lowered position laterally adjacent the container;

(d) operatively connecting the lifting members to the container while the lifting members are in the lowered position thereof;

(e) operating the vertically-movable member so as to vertically move the lifting arms and the container from the lowered position thereof to a raised position thereof to raise the container from the container-supporting surface;

(f) operating the translatory device while the lifting members are in the raised position thereof so as to longitudinally move the vertical movement device from the loading/unloading position to the transport position;

(g) operating the vertically-movable member so as to move the lifting members into a rest position and thereby lower the container onto the vehicle frame;

(h) disconnecting the container from the lifting members while the lifting members are in the resting position thereof; and thereafter (i) operating the spacing device so as to laterally move the lifting members from the resting position thereof and into a stowed position wherein the lifting members are positioned adjacent the vehicle frame below the container.

14. The method of claim 12 or 13, wherein the lifting members and the container are operatively connected by tethers extending therebetween.

15. The method of claim 12 or 13, wherein the spacing device causes the lifting members to pivotally move laterally towards and away from one another.

* * * * *